(12) United States Patent
Wei et al.

(10) Patent No.: US 11,595,176 B2
(45) Date of Patent: Feb. 28, 2023

(54) UE SPECIFIC BEAMFORMING FOR NARROWBAND COMMUNICATIONS

(71) Applicants: QUALCOMM INCORPORATED, San Diego, CA (US); Chao Wei, San Diego, CA (US); Alberto Rico Alvarino, San Diego, CA (US); Wanshi Chen, San Diego, CA (US); Le Liu, San Diego, CA (US)

(72) Inventors: Chao Wei, Beijing (CN); Alberto Rico Alvarino, San Diego, CA (US); Wanshi Chen, San Diego, CA (US); Le Liu, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/051,190

(22) PCT Filed: May 15, 2019

(86) PCT No.: PCT/CN2019/086997
§ 371 (c)(1),
(2) Date: Oct. 28, 2020

(87) PCT Pub. No.: WO2019/219020
PCT Pub. Date: Nov. 21, 2019

(65) Prior Publication Data
US 2021/0376984 A1 Dec. 2, 2021

(30) Foreign Application Priority Data
May 17, 2018 (WO) ................ PCT/CN2018/087267

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0626* (2013.01); *H04L 5/001* (2013.01);
(Continued)

(58) Field of Classification Search
CPC ....... H04L 5/00; H04L 5/0048; H04L 5/0053; H04W 72/04; H04W 88/02;
(Continued)

(56) References Cited

U.S. PATENT DOCUMENTS 10,355,839 B2 * 7/2019 Stirling-Gallacher .... H04L 5/22
10,505,778 B2   12/2019 Kim et al.
(Continued)

FOREIGN PATENT DOCUMENTS

CN  106817209 A   6/2017
CN  107231656 A   10/2017
(Continued)

OTHER PUBLICATIONS

Huawei, et al., "TS 36.300 Section 5 for NB-IoT up to RAN1#84," 3GPP Draft; R1-161554, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Mar. 2, 2016, XP051079463, Retrieved from the Internet: URL: http://www.3gpp.org/ftp/tsg_ran/WG1_RL1/TSGR1_84/Docs/ [retrieved on Mar. 2, 2016], 16 pages.
(Continued)

*Primary Examiner* — Man U Phan
(74) *Attorney, Agent, or Firm* — Holland & Hart LLP

(57) ABSTRACT

Methods, systems, and devices for wireless communications are described in which beamforming may be configured at a user equipment (UE) for narrowband communications. The UE may be a narrowband UE that may provide an indication to a base station that the UE is capable of performing beamforming communication for a unicast channel trans-
(Continued)

mission. Such an indication may be provided in response to the UE receiving a non-beamformed broadcast channel transmission from the base station via a first carrier. The base station may receive the indication and configure the UE with a beamformed narrowband communications scheme. Such a beamformed formed narrowband communications scheme may be used for narrowband downlink shared channel communications, narrowband downlink control channel communications, or combinations thereof. In some cases, beamformed communications may be configured on a different carrier than the first carrier. The base station and UE may then communicate using beamformed transmissions.

30 Claims, 24 Drawing Sheets

(51) Int. Cl.
H04W 72/04 (2023.01)
H04W 88/02 (2009.01)
H04B 7/0413 (2017.01)
(52) U.S. Cl.
CPC ....... *H04L 5/0048* (2013.01); *H04W 72/0406* (2013.01); *H04W 88/02* (2013.01); *H04B 7/0413* (2013.01)
(58) Field of Classification Search
CPC ...... H04W 72/0406; H04W 8/24; H04B 7/06; H04B 7/0413; H04B 7/0626
USPC ......................................................... 370/329
See application file for complete search history.

(56) References Cited

U.S. PATENT DOCUMENTS

| 10,630,524 | B2* | 4/2020 | Abedini | H04L 27/2613 |
| 10,707,979 | B2* | 7/2020 | Ananda | H04W 48/10 |
| 10,812,155 | B2* | 10/2020 | da Silva | H04W 36/0085 |
| 10,868,596 | B2* | 12/2020 | Hwang | H04L 5/0048 |
| 10,887,143 | B2* | 1/2021 | Guo | H04W 72/0446 |
| 10,973,072 | B2* | 4/2021 | Kang | H04L 5/0055 |
| 11,032,842 | B2* | 6/2021 | Bai | H04W 72/1205 |
| 11,271,692 | B2* | 3/2022 | Sui | H04L 5/0044 |
| 2016/0044517 | A1 | 2/2016 | Raghavan et al. | |
| 2017/0033904 | A1* | 2/2017 | Stirling-Gallacher | H04L 5/0048 |
| 2017/0366994 | A1* | 12/2017 | Akkarakaran | H04L 5/0092 |
| 2018/0287845 | A1* | 10/2018 | Kim | H04L 5/0048 |
| 2021/0068075 | A1* | 3/2021 | Uesaka | H04W 72/005 |

FOREIGN PATENT DOCUMENTS

| CN | 107241129 A | 10/2017 |
| WO | WO-2017020699 A1 | 2/2017 |
| WO | WO-2017069474 A1 | 4/2017 |
| WO | WO-2017201273 A1 | 11/2017 |
| WO | WO-2018045092 A1 | 3/2018 |

OTHER PUBLICATIONS

International Search Report and Written Opinion—PCT/CN2018/087267—ISA/EPO—dated Feb. 12, 2019 (183352WO1).
International Search Report and Written Opinion—PCT/CN2019/086997—ISA/EPO—dated Jul. 25, 2019 (183352WO2).
NTT DOCOMO: "Remaining Issues on Beam Indication", 3GPP Draft, 3GPP TSG RAN WG1 Meeting AH 1801, R1-1800660 Beam Management, 3rd Generation Partnership Project (3GPP) Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051384982, pp. 1-5, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018], The whole document.
Intel Corporation: "Light RRC Connection Feature specification in 36.331", 3GPP Draft, 36331 CR2648R3_(REL-14), 3GPP TSG-RAN WG2 Meeting #97, R2-1702421, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13, 2017-Feb. 17, 2017, Mar. 18, 2018 (Mar. 18, 2018), XP051507772, 81 Pages, Retrieved from the Internet: URL: http://www.3gpp.org/ftp/tsg%5Fran/TSG%5FRAN/TSGR%5F75/Docs/RP%2D170627%2Ezip [Retrieved on Mar. 18, 2018] UE-EUTRA Capability Field Description, p. 61.
Supplementary European Search Report—EP19804306—Search Authority—Munich—dated Feb. 17, 2022 (183352EP).

* cited by examiner

UE SPECIFIC BEAMFORMING FOR NARROWBAND COMMUNICATIONS

CROSS REFERENCES

The present application for patent claims priority to International Patent Application No. PCT/CN2019/086997 by Wei et. al., entitled "UE SPECIFIC BEAMFORMING FOR NARROWBAND COMMUNICATIONS," filed May 15, 2019; and to International Patent Application No. PCT/CN2018/087267 by Wei et. al., entitled "UE SPECIFIC BEAMFORMING FOR NARROWBAND COMMUNICATIONS," filed May 17, 2018, each of which is assigned to the assignee hereof and each of which is hereby incorporated by reference in its entirety.

BACKGROUND

The following relates generally to wireless communications, and more specifically to UE specific beamforming for narrowband communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may provide for narrowband communication between wireless devices, such as narrowband Internet of Things (NB-IoT) devices, or devices implementing Machine-to-Machine (M2M) communication or Machine Type Communication (MTC). In some examples, NB-IoT devices may operate using a bandwidth of one resource block (RB) or 180 kHz, as compared to 1.4 MHz to 20 MHz or higher system bandwidths that may be used in some LTE or NR devices. In some cases, NB-IoT devices or other narrowband communications devices may have reduced complexity or reduced performance metrics and may be associated with narrowband communication, low cost operation, low power consumption, or the like.

In some cases, wireless devices (e.g., base stations, UEs, etc.) may also use beamformed or precoded signals for transmission and/or reception of wireless communications. For example, a base station may utilize beamformed or precoded transmissions to provide more directional transmissions that may mitigate path losses that may be experienced by non-beamformed or non-precoded transmissions which may have a relatively wide beam or omnidirectional transmission pattern. Such beamforming or precoding may present challenges for narrowband devices

SUMMARY

The described techniques relate to improved methods, systems, devices, and apparatuses that support user equipment (UE) specific beamforming for narrowband communications. In various aspects, techniques are described in which beamforming may be configured at a UE for narrowband communications. In some cases, the UE may be a narrowband UE that may provide an indication to a base station that the UE is capable of performing beamforming. Such an indication may be provided in response to the UE receiving a non-beamformed broadcast channel transmission from the base station via a first carrier (e.g., an anchor carrier). The base station may receive the indication and configure the UE with a beamformed narrowband communications scheme. Such a beamformed narrowband communications scheme may be used for narrowband downlink shared channel communications, narrowband downlink control channel communications, or combinations thereof. In some cases, beamformed communications may be configured on a different carrier than the first carrier. The base station and UE may then communicate using beamformed transmissions, which may provide more efficient and more reliable communications than non-beamformed transmissions.

A method of wireless communication at a UE is described. The method may include receiving, via a first carrier, a non-beamformed narrowband physical broadcast channel (NPBCH) transmission from a base station according to an NPBCH communications scheme, transmitting, responsive to the NPBCH transmission, an indication to the base station of a UE capability to support beamformed transmissions for narrowband downlink communications from the base station, receiving, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receiving the one or more beamformed narrowband downlink shared channel communications or narrowband downlink control channel communications based on the beamformed narrowband communications scheme.

An apparatus for wireless communication at a UE is described. The apparatus may include a processor, memory in electronic communication with the processor, and instructions stored in the memory. The instructions may be executable by the processor to cause the apparatus to receive, via a first carrier, an NPBCH transmission from a base station according to an NPBCH communications scheme, transmit, responsive to the NPBCH transmission, an indication to the base station of a UE capability to support beamformed transmissions for narrowband downlink communications from the base station, receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receive the one or more beamformed narrowband downlink shared channel communications or narrowband downlink control channel communications based on the beamformed narrowband communications scheme.

Another apparatus for wireless communication at a UE is described. The apparatus may include means for receiving, via a first carrier, an NPBCH transmission from a base station according to an NPBCH communications scheme, transmitting, responsive to the NPBCH transmission, an indication to the base station of a UE capability to support beamformed transmissions for narrowband downlink communications from the base station, receiving, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receiving the one or more beamformed narrowband downlink shared channel communications or narrowband downlink control channel communications based on the beamformed narrowband communications scheme.

A non-transitory computer-readable medium storing code for wireless communication at a UE is described. The code may include instructions executable by a processor to receive, via a first carrier, an NPBCH transmission from a base station according to an NPBCH communications scheme, transmit, responsive to the NPBCH transmission, an indication to the base station of a UE capability to support beamformed transmissions for narrowband downlink communications from the base station, receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receive the one or more beamformed narrowband downlink shared channel communications or narrowband downlink control channel communications based on the beamformed narrowband communications scheme.

In some examples of the method, apparatuses, and non-transitory computer-readable medium described herein, the beamformed narrowband communications scheme may be based on a precoded narrowband reference signal (NRS), and the NPBCH communications scheme uses a non-precoded NRS. In some examples of the method, apparatuses, and non-transitory computer-readable medium described herein, the configuration information includes a default precoding cycling granularity for the precoded NRS that indicates a number of subframes between precoding changes for the precoded NRS. Some examples of the method, apparatuses, and non-transitory computer-readable medium described herein may further include operations, features, means, or instructions for measuring one or more precoded NRS transmissions based on the default precoding cycling granularity, and where cross-subframe channel estimation may be restricted.

In some examples of the method, apparatuses, and non-transitory computer-readable medium described herein, the one or more precoded NRS transmissions may be received via a single antenna port. In some examples of the method, apparatuses, and non-transitory computer-readable medium described herein, the one or more precoded NRS transmissions may be received via two antenna ports, and where the receiving may include operations, features, means, or instructions for combining received signals from each of the two antenna ports and decoding the beamformed narrowband downlink shared channel communications or narrowband downlink control channel communications based on the combined received signals. In some examples of the method, apparatuses, and non-transitory computer-readable medium described herein, the decoding may be based on space frequency block coding (SFBC) or per-resource element (RE) level co-phase cycling. In some examples of the method, apparatuses, and non-transitory computer-readable medium described herein, the precoded NRS transmission of a single antenna port or two antenna ports may be independently configured for the narrowband downlink control channel and the narrowband downlink shared channel.

Some examples of the method, apparatuses, and non-transitory computer-readable medium described herein may further include operations, features, means, or instructions for receiving downlink control information (DCI) that indicates a change of precoding cycling granularity for a scheduled narrowband downlink shared channel, and where a precoding matrix for a subframe may be based on one or more of a subframe number, the default precoding cycling granularity, a configured number of beams, or a total number of transmission subframes scheduled for the narrowband downlink shared channel. In some examples of the method, apparatuses, and non-transitory computer-readable medium described herein, the change of precoding cycling granularity indicates that a non-precoded NRS may be used for the scheduled narrowband downlink shared channel.

Some examples of the method, apparatuses, and non-transitory computer-readable medium described herein may further include operations, features, means, or instructions for receiving downlink control information (DCI) that indicates a change of precoding cycling granularity for a scheduled narrowband downlink shared channel, where the change of precoding cycling granularity may be based on a configured number of precoders for the scheduled narrowband downlink shared channel. In some examples of the method, apparatuses, and non-transitory computer-readable medium described herein, the change of precoding cycling granularity indicates that a non-precoded NRS may be used for the scheduled narrowband downlink shared channel.

In some examples of the method, apparatuses, and non-transitory computer-readable medium described herein the configuration information includes a first number of antenna ports for the beamformed narrowband communications scheme different than a second number of antenna ports for the NPBCH communications scheme, where the one or more beamformed narrowband downlink shared channel communications or narrowband downlink control channel communications are received via the first number of antenna ports.

In some examples of the method, apparatuses, and non-transitory computer-readable medium described herein the narrowband communications scheme may be independently configured for the narrowband downlink control channel and the narrowband downlink shared channel.

In some examples of the method, apparatuses, and non-transitory computer-readable medium described herein, the configuration information further indicates whether a multi-user multiple input multiple output (MU-MIMO) or a single-user multiple input multiple output (SU-MIMO) communications scheme may be used for downlink communications to the UE. Some examples of the method, apparatuses, and non-transitory computer-readable medium described herein may further include operations, features, means, or instructions for determining a reference signal pattern based on the indication of MU-MIMO or SU-MIMO.

Some examples of the method, apparatuses, and non-transitory computer-readable medium described herein may further include operations, features, means, or instructions for receiving second configuration information indicating the narrowband downlink control channel may be on the first carrier, and where the beamformed narrowband communications scheme may be used only for the narrowband downlink shared channel communications.

In some examples of the method, apparatuses, and non-transitory computer-readable medium described herein, the configuration information includes information for an aperiodic sounding reference signal (SRS). Some examples of the method, apparatuses, and non-transitory computer-readable medium described herein may further include operations, features, means, or instructions for receiving a trigger to perform an aperiodic SRS transmission and transmitting the SRS to the base station responsive to the trigger.

Some examples of the method, apparatuses, and non-transitory computer-readable medium described herein may further include operations, features, means, or instructions for receiving a trigger to perform an aperiodic channel state information (CSI) measurement, measuring one or more reference signal transmissions from the base station responsive to the trigger and transmitting a CSI measurement report to the base station based on the measuring. In some examples of the method, apparatuses, and non-transitory computer-readable medium described herein, a set of precoded NRSs or a set of precoded aperiodic CSI reference signals may be transmitted. In some cases, the measuring includes determining which of the set of precoded reference signals may be preferred. In some examples of the method, apparatuses, and non-transitory computer-readable medium described herein, the trigger may be received in a downlink grant and an indication of which of the set of precoded reference signals may be preferred may be transmitted in an acknowledgment/negative-acknowledgment (ACK/NACK) resource configured by the base station. In some examples of the method, apparatuses, and non-transitory computer-readable medium described herein, the set of precoded reference signals may be transmitted using the null resource elements of the narrowband downlink shared channel.

A method of wireless communication at a base station is described. The method may include transmitting, via a first carrier, an NPBCH communication according to an NPBCH communications scheme, receiving, responsive to the NPBCH communication, an indication from a UE that indicates a UE capability to support beamformed communications for narrowband downlink communications from the base station, and determining, based on the indication of the UE capability, a beamformed narrowband communications scheme for one or more of narrowband downlink shared channel communications or narrowband downlink control channel communications to the UE. The method may further include transmitting, to the UE, configuration information indicating the beamformed narrowband communications scheme, where the one or more beamformed narrowband downlink shared channel communications or narrowband downlink control channel communications may be configured on a different carrier than the NPBCH, and communicating with the UE based on the beamformed narrowband communications scheme.

An apparatus for wireless communication at a base station is described. The apparatus may include a processor, memory in electronic communication with the processor, and instructions stored in the memory. The instructions may be executable by the processor to cause the apparatus to transmit, via a first carrier, an NPBCH communication according to an NPBCH communications scheme, receive, responsive to the NPBCH communication, an indication from a UE that indicates a UE capability to support beamformed communications for narrowband downlink communications from the base station, and determine, based on the indication of the UE capability, a beamformed narrowband communications scheme for one or more of narrowband downlink shared channel communications or narrowband downlink control channel communications to the UE. The instructions may be further executable by the processor to cause the apparatus to transmit, to the UE, configuration information indicating the beamformed narrowband communications scheme, where the one or more beamformed narrowband downlink shared channel communications or narrowband downlink control channel communications may be configured on a different carrier than the NPBCH, and communicate with the UE based on the beamformed narrowband communications scheme.

Another apparatus for wireless communication at a base station is described. The apparatus may include means for transmitting, via a first carrier, an NPBCH communication according to an NPBCH communications scheme, receiving, responsive to the NPBCH communication, an indication from a UE that indicates a UE capability to support beamformed communications for narrowband downlink communications from the base station, and determining, based on the indication of the UE capability, a beamformed narrowband communications scheme for one or more of narrowband downlink shared channel communications or narrowband downlink control channel communications to the UE. The apparatus may further include means for transmitting, to the UE, configuration information indicating the beamformed narrowband communications scheme, where the one or more beamformed narrowband downlink shared channel communications or narrowband downlink control channel communications may be configured on a different carrier than the NPBCH, and communicating with the UE based on the beamformed narrowband communications scheme.

A non-transitory computer-readable medium storing code for wireless communication at a base station is described. The code may include instructions executable by a processor to transmit, via a first carrier, an NPBCH communication according to an NPBCH communications scheme, receive, responsive to the NPBCH communication, an indication from a UE that indicates a UE capability to support beamformed communications for narrowband downlink communications from the base station, and determine, based on the indication of the UE capability, a beamformed narrowband communications scheme for one or more of narrowband downlink shared channel communications or narrowband downlink control channel communications to the UE. The code may further include instructions executable by a processor to transmit, to the UE, configuration information indicating the beamformed narrowband communications scheme, where the one or more beamformed narrowband downlink shared channel communications or narrowband downlink control channel communications may be configured on a different carrier than the NPBCH, and communicate with the UE based on the beamformed narrowband communications scheme.

In some examples of the method, apparatuses, and non-transitory computer-readable medium described herein, the beamformed narrowband communications scheme may be based on a precoded NRS, and the NPBCH communications scheme uses a non-precoded NRS. In some examples of the method, apparatuses, and non-transitory computer-readable medium described herein, the configuration information includes a default precoding cycling granularity for the precoded NRS that indicates a number of subframes between precoding changes for the precoded NRS. In some examples of the method, apparatuses, and non-transitory computer-readable medium described herein, the precoded NRS may be transmitted via a single antenna port.

Some examples of the method, apparatuses, and non-transitory computer-readable medium described herein may further include operations, features, means, or instructions for transmitting one or more precoded NRSs based on at least in part on the default precoding cycling granularity, and where cross-subframe channel estimation may be restricted. Some examples of the method, apparatuses, and non-transitory computer-readable medium described herein may further include operations, features, means, or instructions for receiving a measurement report from the UE based on the one or more precoded NRS transmissions and determining beamforming parameters for the one or more beamformed narrowband downlink shared channel communications or narrowband downlink control channel communications to the UE based on the measurement report. In some examples of the method, apparatuses, and non-transitory computer-readable medium described herein, the one or more beamformed narrowband downlink shared channel communications or narrowband downlink control channel communications may include data that may be coded based on SFBC or per-RE level co-phase cycling. In some examples of the method, apparatuses, and non-transitory computer-readable medium described herein, the precoded NRS transmission of a single antenna port or two antenna ports may be independently configured for the narrowband downlink control channel and the narrowband downlink shared channel.

Some examples of the method, apparatuses, and non-transitory computer-readable medium described herein may further include operations, features, means, or instructions for transmitting DCI that indicates a change of precoding cycling granularity for a scheduled narrowband downlink shared channel, and where a precoding matrix for a subframe may be based on one or more of a subframe number, the default precoding cycling granularity, a configured number of precoders, or a total number of transmission subframes scheduled for the narrowband downlink shared channel. In some examples of the method, apparatuses, and non-transitory computer-readable medium described herein, the change of precoding cycling granularity indicates that a non-precoded NRS may be used for the scheduled narrowband downlink shared channel.

In some examples of the method, apparatuses, and non-transitory computer-readable medium described herein, the configuration information further indicates whether a MU-MIMO or a SU-MIMO communications scheme may be used for downlink transmissions to the UE. Some examples of the method, apparatuses, and non-transitory computer-readable medium described herein may further include operations, features, means, or instructions for determining a reference signal pattern based on the indication of MU-MIMO or SU-MIMO.

Some examples of the method, apparatuses, and non-transitory computer-readable medium described herein may further include operations, features, means, or instructions for transmitting a second configuration to the UE indicating that the narrowband downlink control channel may be on the first carrier, and where the beamformed narrowband communications scheme may be used only for the narrowband downlink shared channel communications.

In some examples of the method, apparatuses, and non-transitory computer-readable medium described herein, the configuration information includes information for an aperiodic SRS. Some examples of the method, apparatuses, and non-transitory computer-readable medium described herein may further include operations, features, means, or instructions for transmitting a trigger to the UE to perform an aperiodic SRS transmission and receiving an SRS from the UE responsive to the trigger. In some examples of the method, apparatuses, and non-transitory computer-readable medium described herein, the trigger is transmitted in a downlink grant. Some examples of the method, apparatuses, and non-transitory computer-readable medium described herein may further include operations, features, means, or instructions for transmitting a trigger to the UE to perform an aperiodic CSI measurement and receiving a CSI measurement report from the UE responsive to the trigger.

Some examples of the method, apparatuses, and non-transitory computer-readable medium described herein may further include operations, features, means, or instructions for transmitting one of: a set of precoded NRSs or a set of precoded aperiodic CSI reference signals using the null resource elements of the narrowband downlink shared channel. Some examples of the method, apparatuses, and non-transitory computer-readable medium described herein may further include operations, features, means, or instructions for receiving an indication of which of the set of precoded reference signals may be preferred at the UE. Some examples of the method, apparatuses, and non-transitory computer-readable medium described herein may further include operations, features, means, or instructions for configuring an uplink ACK/NACK resource for providing the indication of which of the set of precoded reference signals may be preferred and providing the uplink ACK/NACK resource to the UE with the configuration information, and where the indication of which of the set of precoded reference signals may be preferred at the UE may be received via the uplink ACK/NACK resource.

feedback that supports UE specific beamforming for narrowband communications in accordance with aspects of the present disclosure.

Figure 5:
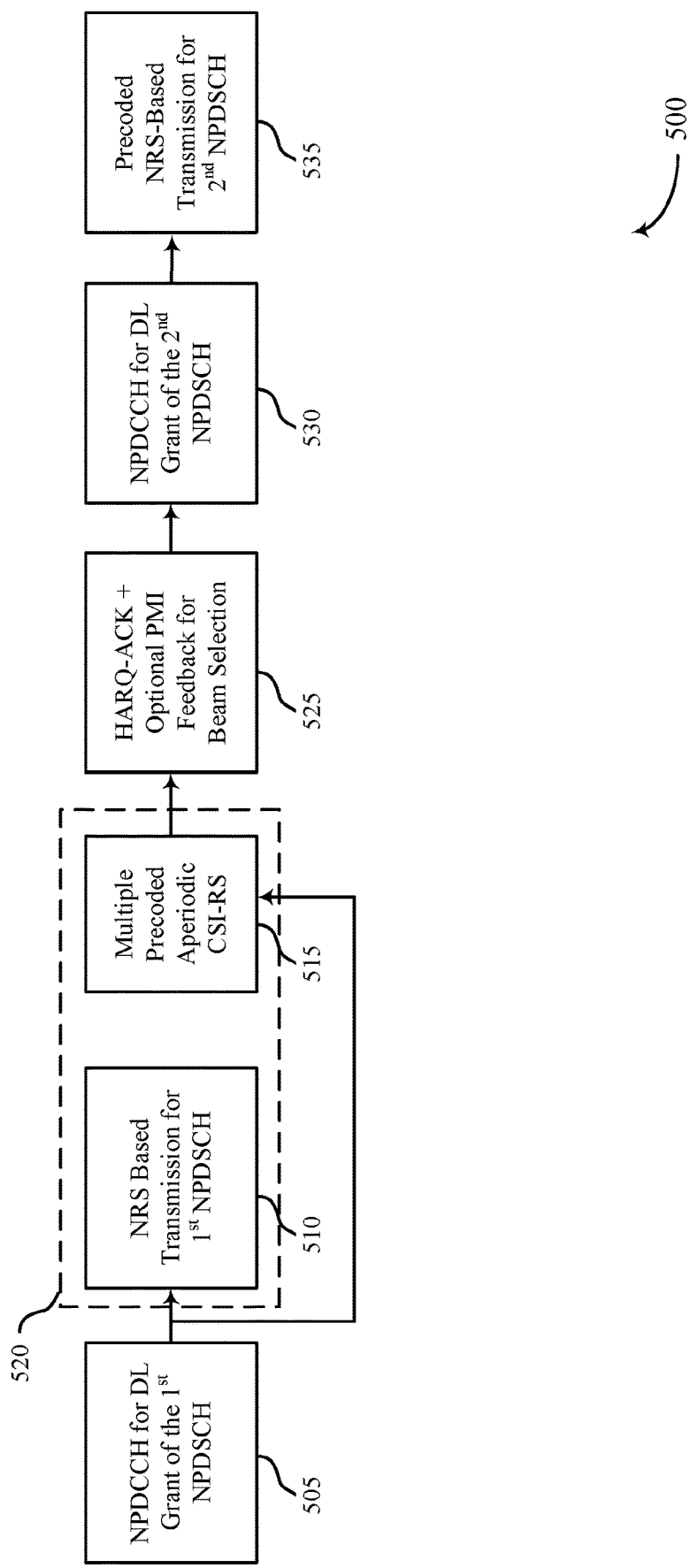

FIG. 5 illustrates an example of aperiodic CSI reference signal feedback that supports UE specific beamforming for narrowband communications in accordance with aspects of the present disclosure.

Figure 6:
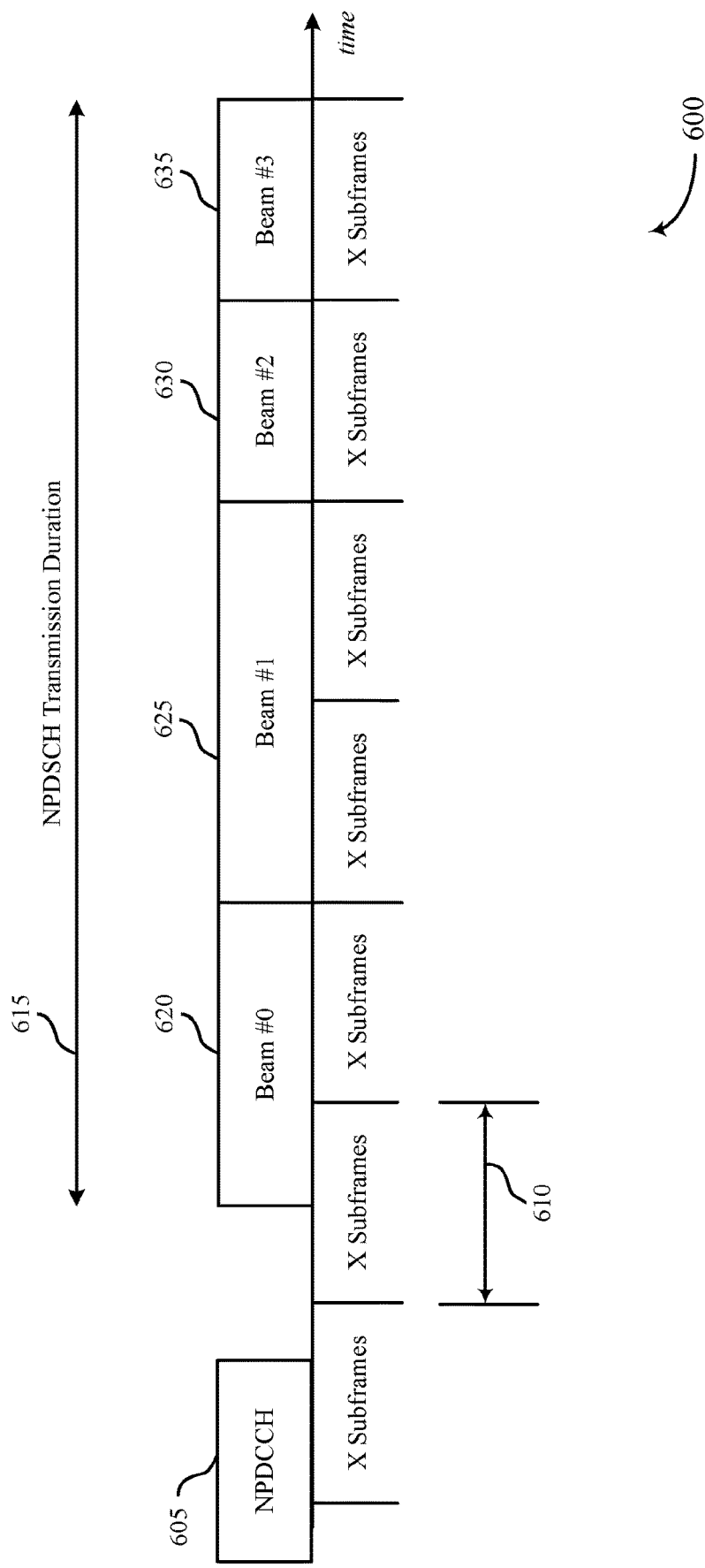

FIG. 6 illustrates an example of a precoder cycling that supports UE specific beamforming for narrowband communications in accordance with aspects of the present disclosure.

Figure 7:
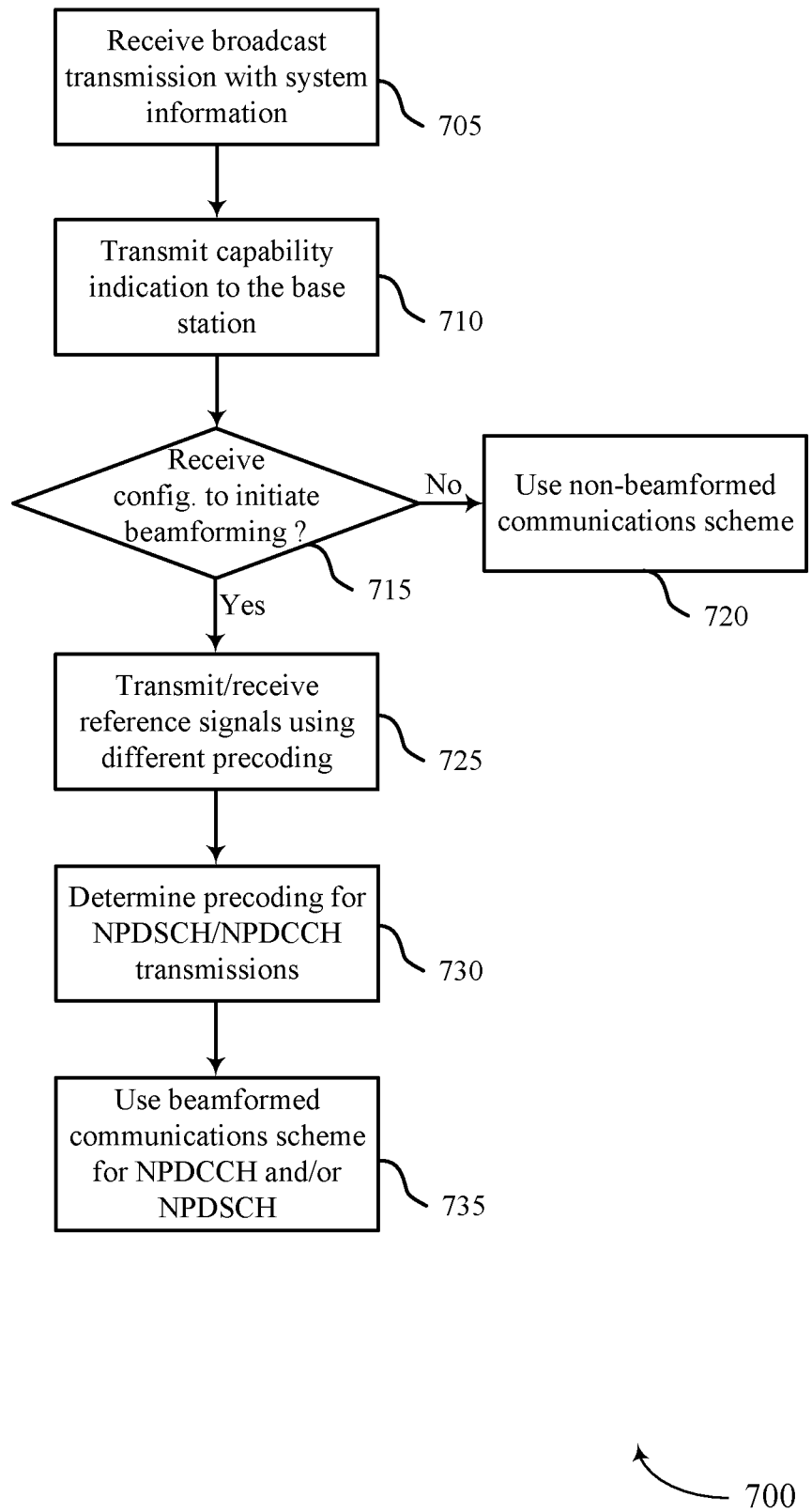

FIG. 7 illustrates an example of a process flow that supports UE specific beamforming for narrowband communications in accordance with aspects of the present disclosure.

Figure 8:
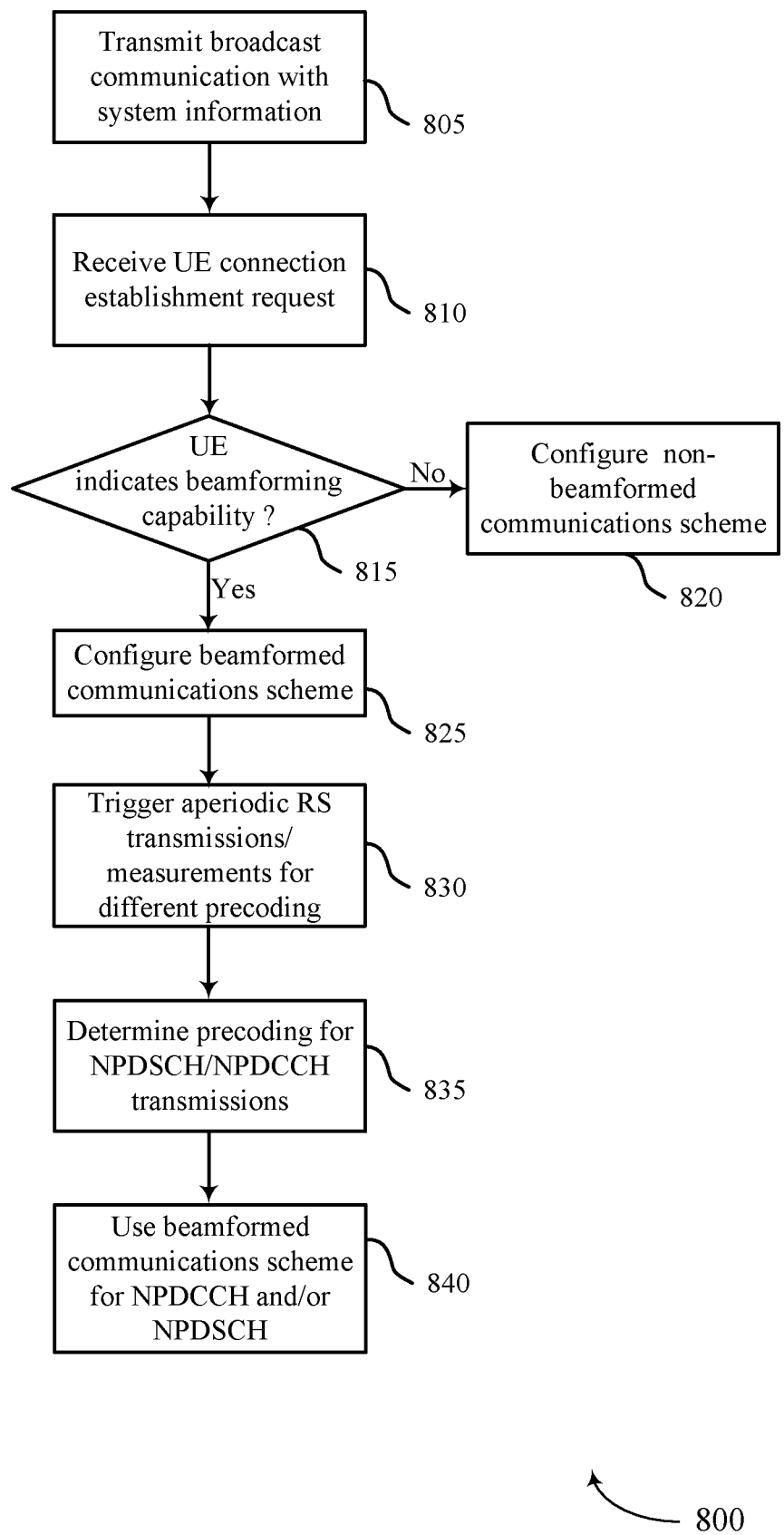

FIG. 8 illustrates another example of a process flow that supports UE specific beamforming for narrowband communications in accordance with aspects of the present disclosure.

Figure 9:
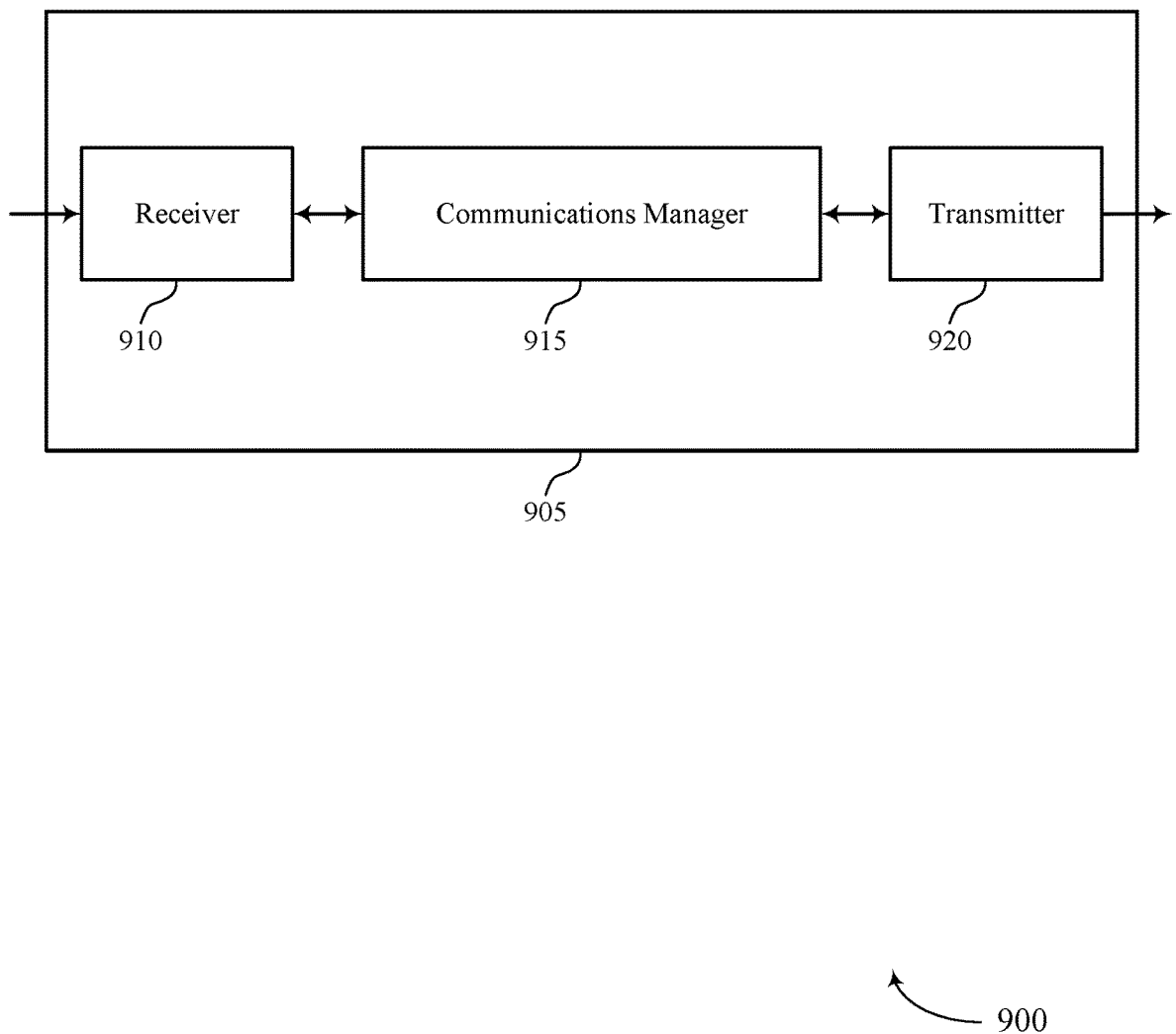
Figure 10:
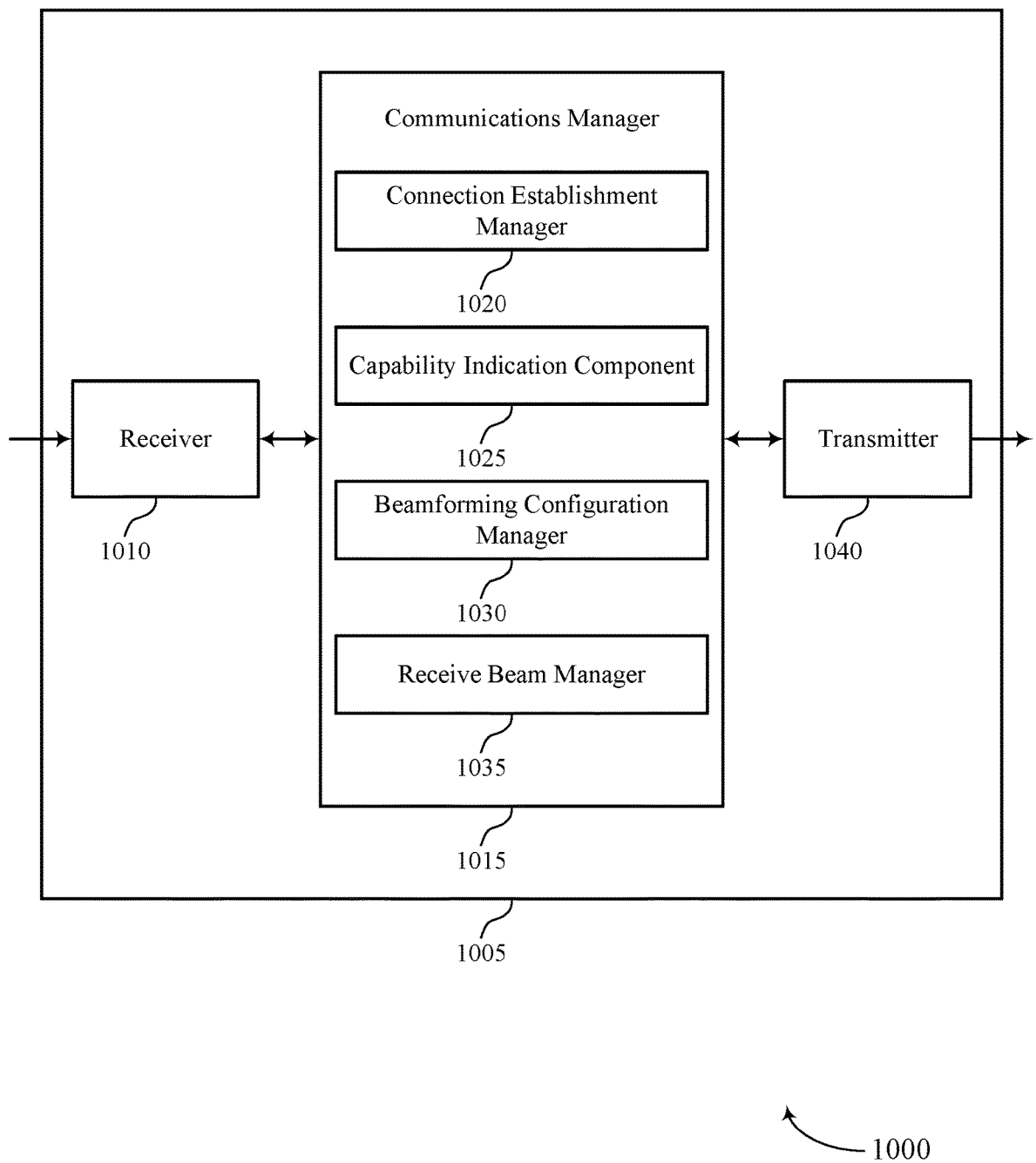

FIGS. 9 and 10 show block diagrams of devices that support UE specific beamforming for narrowband communications in accordance with aspects of the present disclosure.

Figure 11:
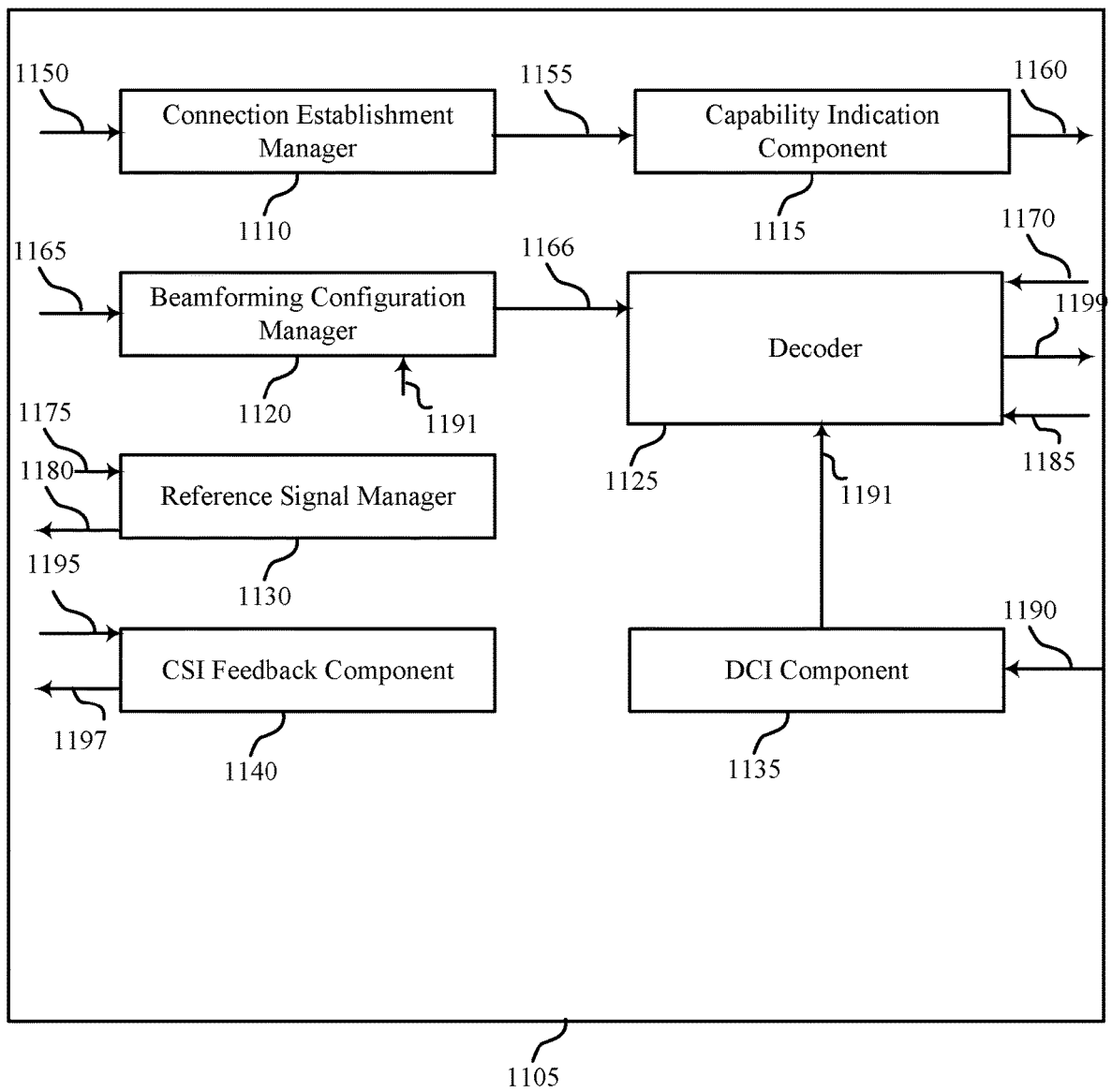

FIG. 11 shows a block diagram of a communications manager that supports UE specific beamforming for narrowband communications in accordance with aspects of the present disclosure.

Figure 12:
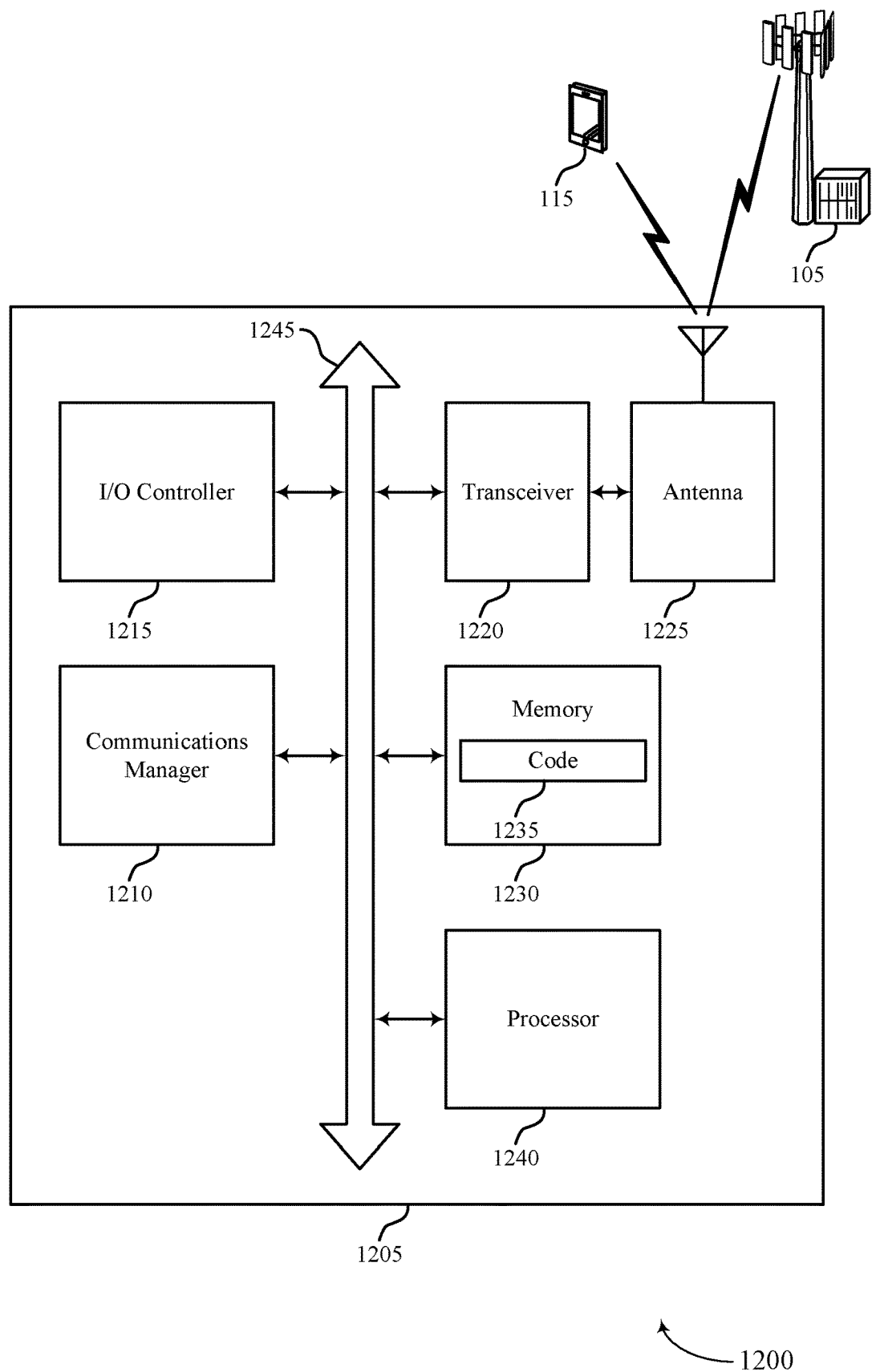

FIG. 12 shows a diagram of a system including a device that supports UE specific beamforming for narrowband communications in accordance with aspects of the present disclosure.

Figure 13:
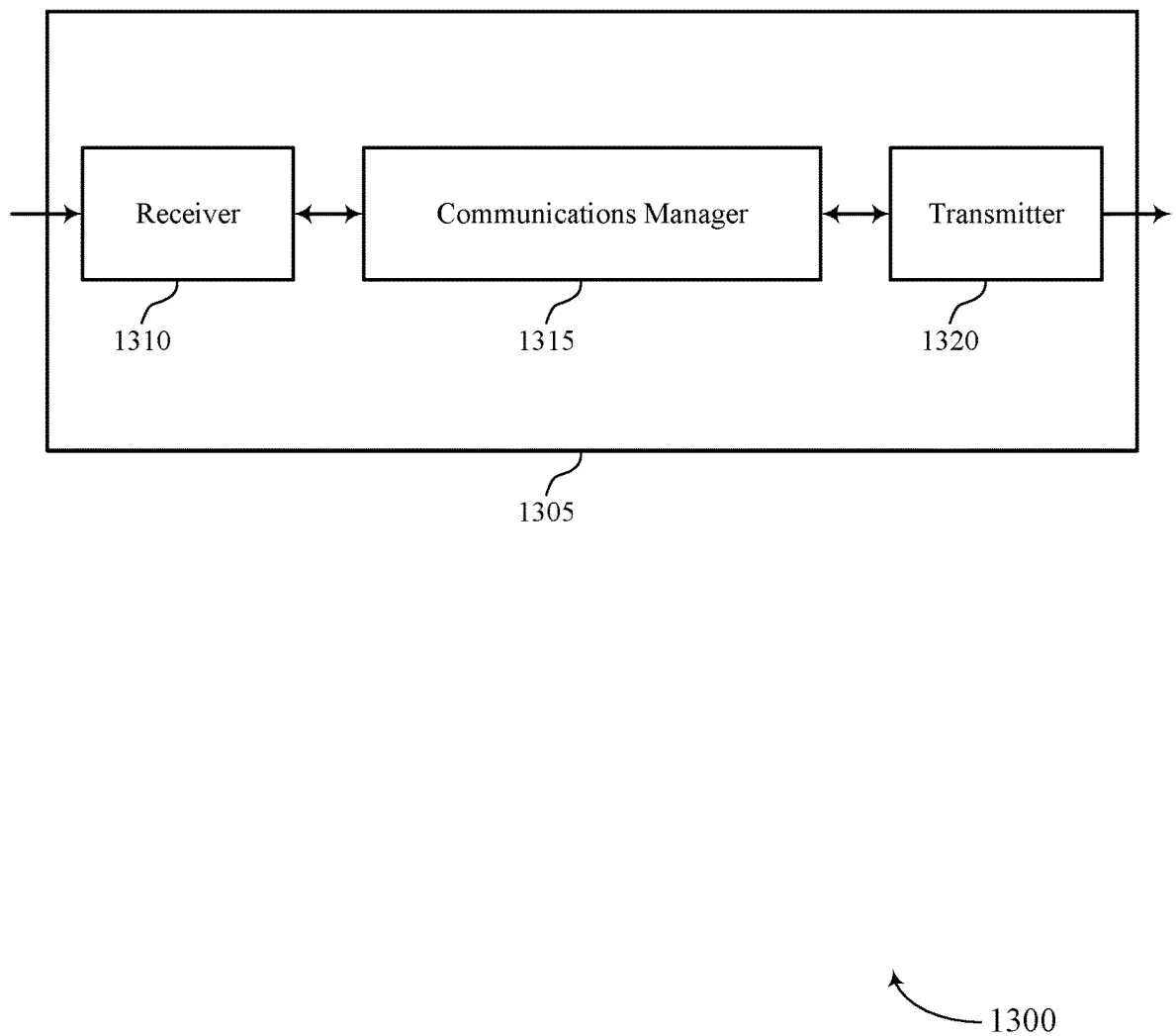
Figure 14:
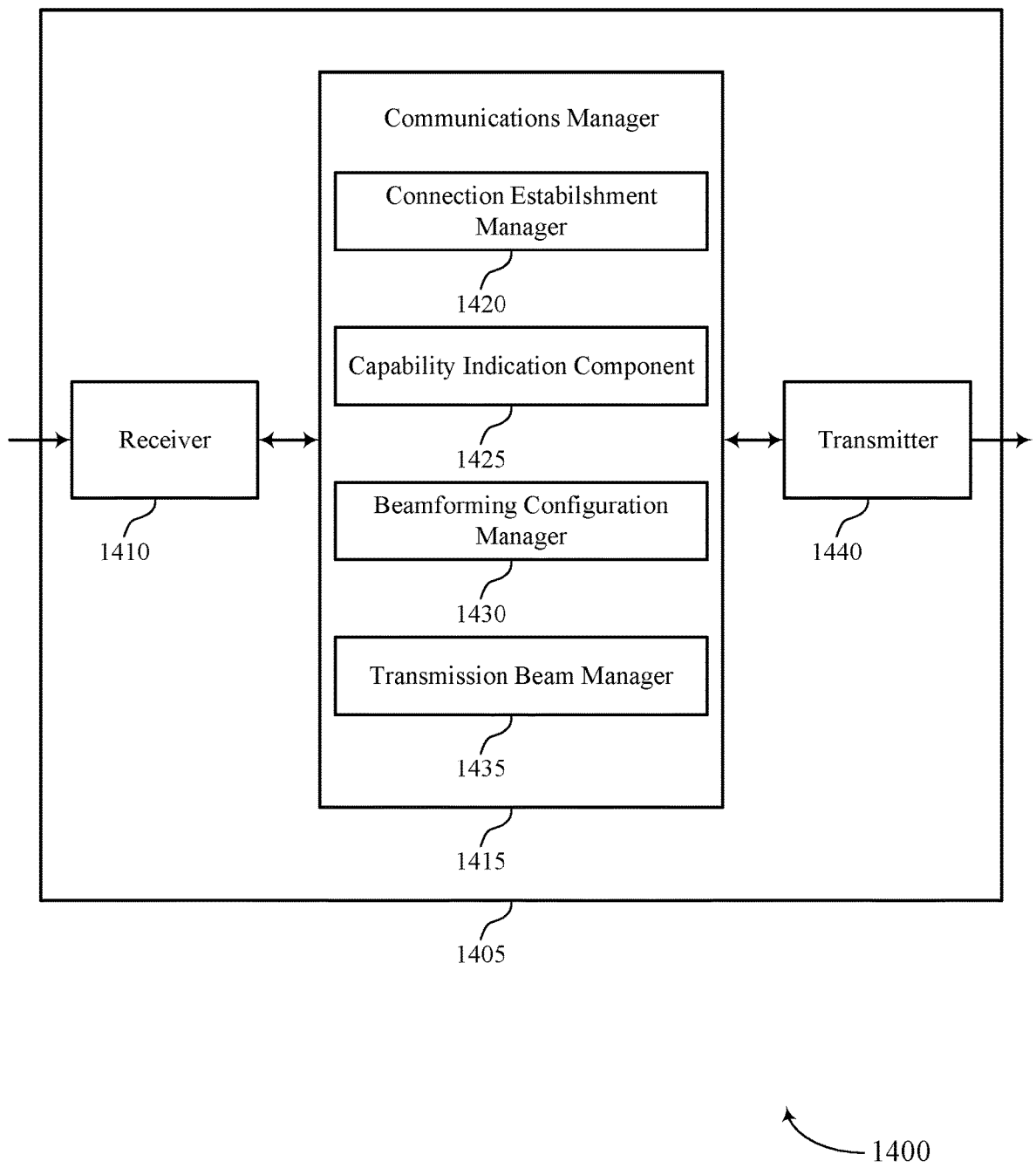

FIGS. 13 and 14 show block diagrams of devices that support UE specific beamforming for narrowband communications in accordance with aspects of the present disclosure.

Figure 15:
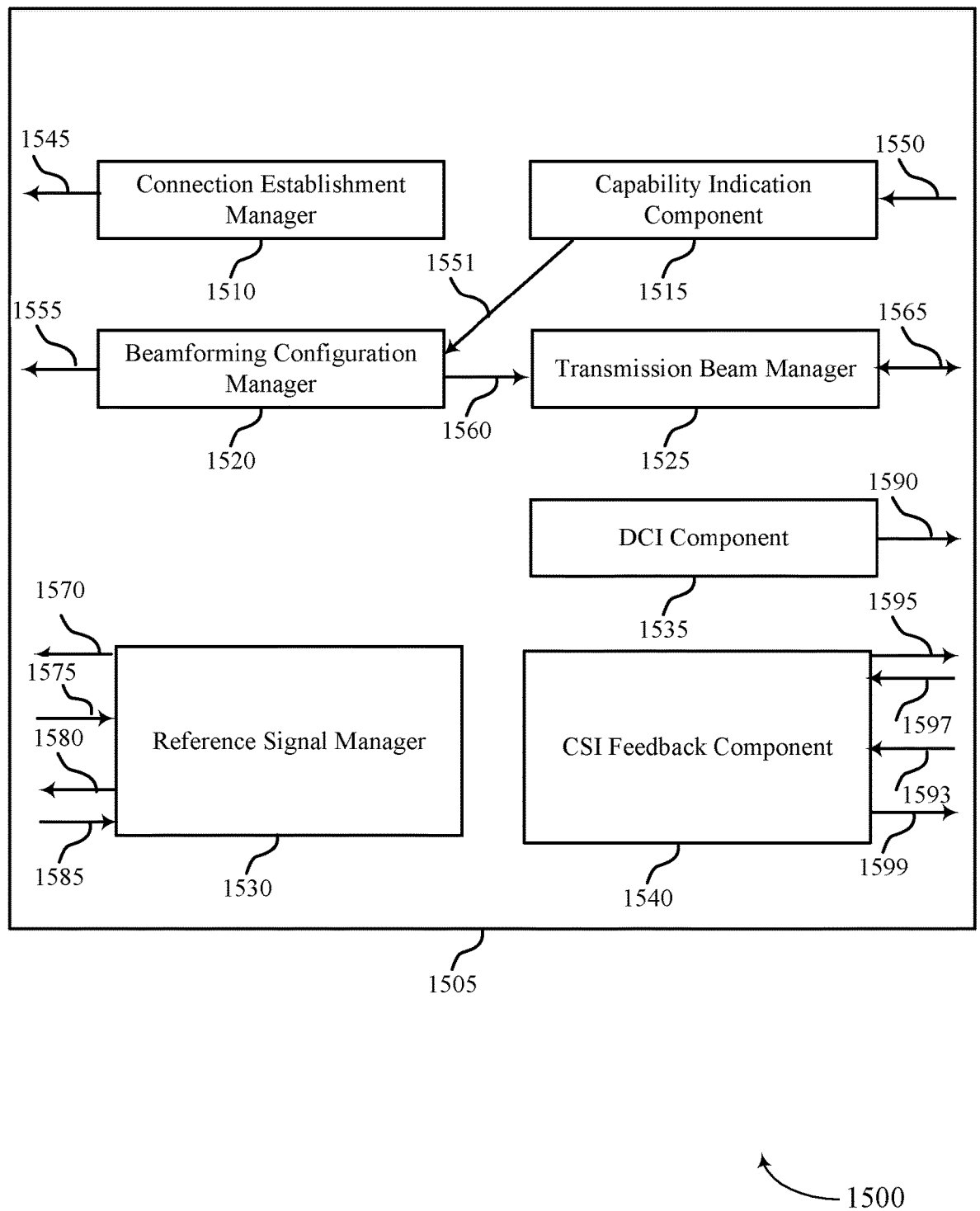

FIG. 15 shows a block diagram of a communications manager that supports UE specific beamforming for narrowband communications in accordance with aspects of the present disclosure.

Figure 16:
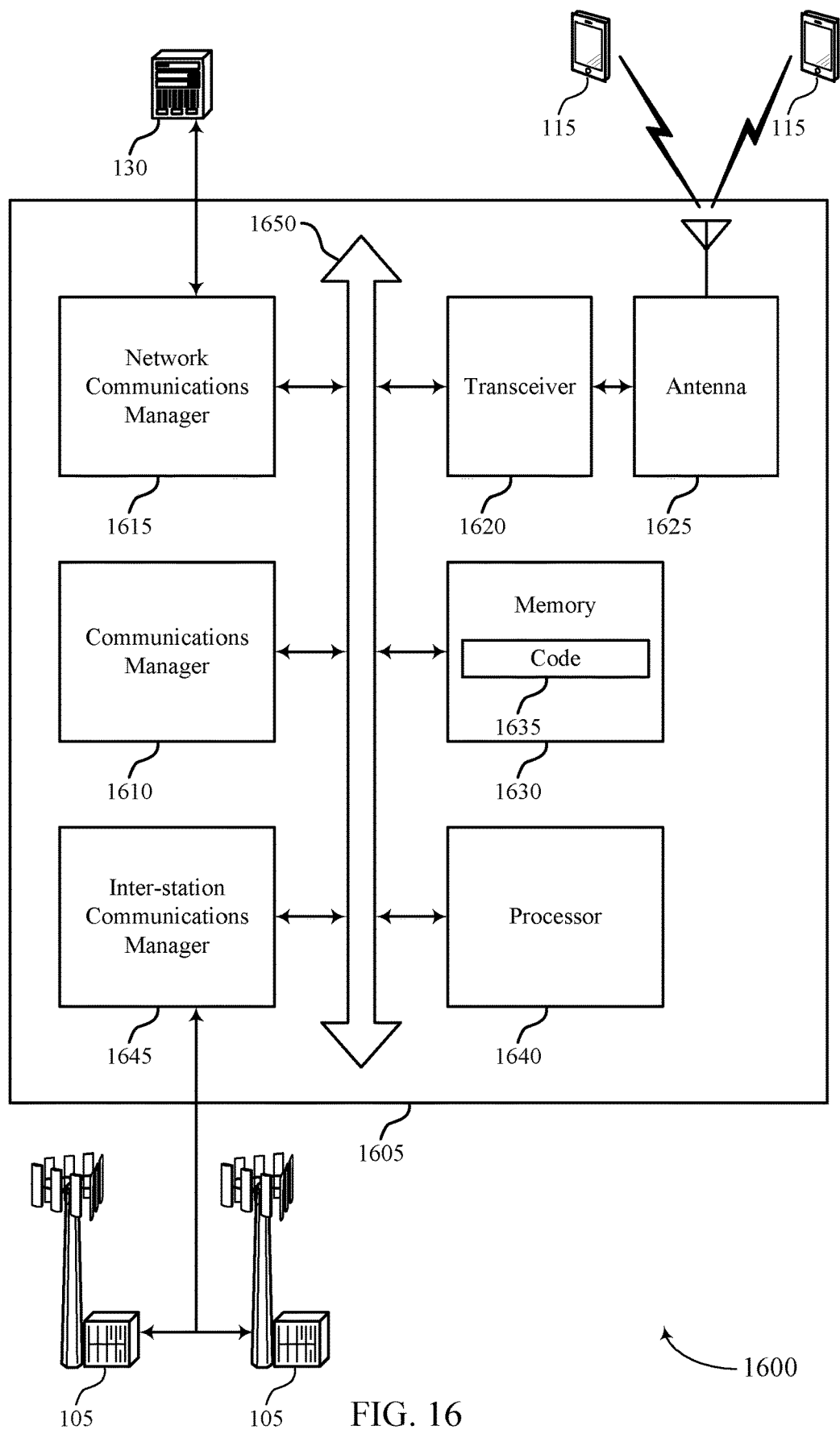

FIG. 16 shows a diagram of a system including a device that supports UE specific beamforming for narrowband communications in accordance with aspects of the present disclosure.

FIGS. 17 through 24 show flowcharts illustrating methods that support UE specific beamforming for narrowband communications in accordance with aspects of the present disclosure.

DETAILED DESCRIPTION

Various aspects of the present disclosure relate to methods, systems, devices, and apparatuses that support configuration of user equipment (UE) specific beamforming for narrowband communications. In some cases, a base station may configure beamforming at a UE for narrowband communications, such as narrowband physical downlink control channel (NPDCCH) communications, narrowband physical downlink shared channel (NPDSCH), or both. In some cases, the UE may provide an indication to a base station that the UE is capable of performing beamforming. Such an indication may be provided in response to the UE receiving a non-beamformed narrowband physical broadcast channel (NPBCH) transmission from the base station via a first carrier (e.g., an anchor carrier). The base station may receive the indication and configure the UE with a beamformed narrowband communications scheme for NPDCCH communications, NPDSCH communications, or combinations thereof. In some cases, beamformed NPDSCH communications may be configured independently of beamformed or non-beamformed NPDCCH communications. In some cases, beamformed communications may be configured on a different carrier than the first carrier. The base station and UE may then communicate using beamformed transmissions, which may provide more efficient and more reliable communications than non-beamformed transmissions.

In some cases, such UEs may be narrowband Internet of Things (NB-IoT) devices that may utilize a narrowband region of a system operating frequency bandwidth. In some cases, the UEs may use Machine-to-Machine (M2M) communication or Machine Type Communication (MTC) data communication technologies that allow automated devices to communicate with one another with little or no human intervention. For example, M2M and/or MTC may refer to communications from a device that integrate sensors or meters to measure or capture information and relay that information to a central server or application program that may make use of the information or present the information to humans interacting with the program or application. Such a device may be called an NB-IoT device, a M2M device, an MTC device, or an MTC UE, to provide a few examples, and may be referred to simply as a UE herein. In some examples, the narrowband communications may occupy one resource block (RB) of system bandwidth, which may correspond to 180 kHz of bandwidth, as compared to 1.4 MHz to 20 MHz or higher system bandwidth that may be used in non-narrowband wireless devices. When referring to narrowband transmissions, reference may be made to transmissions having a bandwidth that may be narrower than a bandwidth associated with one or more wideband channels in a wireless communications system. For example, in a 5G or NR system, wideband channel bandwidth may be between 20 MHz and 80 MHz, and a narrowband device may use a bandwidth that may be lower than a lowest wideband channel bandwidth, such as 180 kHz (corresponding to a bandwidth of one RB), for example.

As indicated above, in some cases beamforming may be used in narrowband communications, which may enhance reliability and efficiency of a wireless communications system through more directional transmissions. Beamforming may be achieved by adjusting the signals communicated via antenna elements of an antenna array such that signals propagating at particular orientations with respect to an antenna array experience constructive interference while others experience destructive interference. A transmitting device or a receiving device may apply certain amplitude and phase offsets to signals carried via two or more antenna elements in the antenna array associated with the device. The adjustments associated with each of the antenna elements may be defined by a beamforming weight set, which may also be referred to as a precoding vector or precoding parameters, associated with a particular orientation (e.g., with respect to the antenna array of the transmitting device or receiving device, or with respect to some other orientation). In some cases, different sets of beamforming parameters may be provided in a precoding matrix, and a particular set or vector of beamforming parameters may be indicated by a precoding matrix indicator (PMI). When precoding is applied at a transmitter, the resultant signal that is transmitted may be referred to as a precoded signal or a beamformed signal. When referring to beamformed communications herein, reference is made to communications in which at least some degree of directionality may be achieved through adjustments associated with two or more antenna elements, such as through the selection of a PMI to be used for the beamformed communication.

In some cases, a base station may communicate with a relatively large number of narrowband UEs, such as in an NB-IoT network. Certain of the UEs may have different capabilities than other of the UEs, which may include beamforming capabilities. For example, a first subset of UEs in such a network may be relatively low-complexity devices that may not be capable of beamforming, while a second subset of UEs may have relatively higher complexity and may be capable of beamforming. A base station may thus transmit signals in a non-beamformed communications scheme for all communications with the first subset of UEs, and may use beamforming for at least some communications with the second subset of UEs. In some cases, UEs may transmit an indication of UE capability to the base station, and the base station may configure beamforming based on the UE capability. In some cases, UEs may transmit an explicit indication of capability (e.g., in an information element (IE) within a capability indication message) to the base station. In other cases, the UE capability may be inferred from a UE category or UE class that may be transmitted to the base station. In some cases, multiple carriers may be configured in a network, and a first carrier, or anchor carrier, may be configured for non-beamformed transmissions that may be used by all of the narrowband UEs, and a second carrier may be configured for beamformed transmissions that may be used by the second subset of UEs.

In some cases, beamforming parameters for beamformed transmissions may be determined based on one or more reference signal transmissions. For example, a narrowband reference signal (NRS) may be transmitted using two or more different sets of precoding parameters which a UE may measure to identify a preferred beam (e.g., based on which set of precoding parameters provided a highest signal strength at the UE). In some cases, the base station may configure the UE with a reference signal pattern that indicates reference signal resources that may be measured at the UE. The UE may measure the received reference signals and provide a measurement report to the base station to identify a preferred beam. In some cases, precoder cycling may be used in which scheduled narrowband transmissions may use precoding values for a number of subframes, and then switch to different precoding for a second number of subframes. In such cases, a precoding matrix for a subframe may be determined based on one or more of a subframe number, a default precoding cycling granularity, a configured number of precoders or beams, a total number of transmission subframes scheduled for the narrowband downlink transmissions, or any combination thereof. In some cases, downlink control information (DCI) may indicate a change in precoding cycling granularity for a scheduled narrowband downlink shared channel.

In some cases, the UE may provide an indication of a preferred precoding matrix. Such an indication of the preferred precoding matrix may be provided, in some cases, via an acknowledgment/negative-acknowledgment (ACK/NACK) resource that may be configured by the base station for indicating the preferred precoding matrix. In such a case, the UE may select one of the configured ACK/NACK resources based on an index of a preferred precoding matrix. For example, the resource of the ACK/NACK transmission may be selected from a number of available subcarrier offsets (e.g., offset values are {0, −1, −2, −3, −4, −5, −6, −7} in the case of 8 precoding matrix beams). Such a technique may provide the indication of the preferred precoding matrix while not increasing the uplink feedback overhead for providing the indication.

Aspects of the disclosure are initially described in the context of a wireless communications system. Various examples of beamforming configurations are then discussed. Aspects of the disclosure are further illustrated by and described with reference to apparatus diagrams, system diagrams, and flowcharts that relate to UE specific beamforming for narrowband communications.

Figure 1:
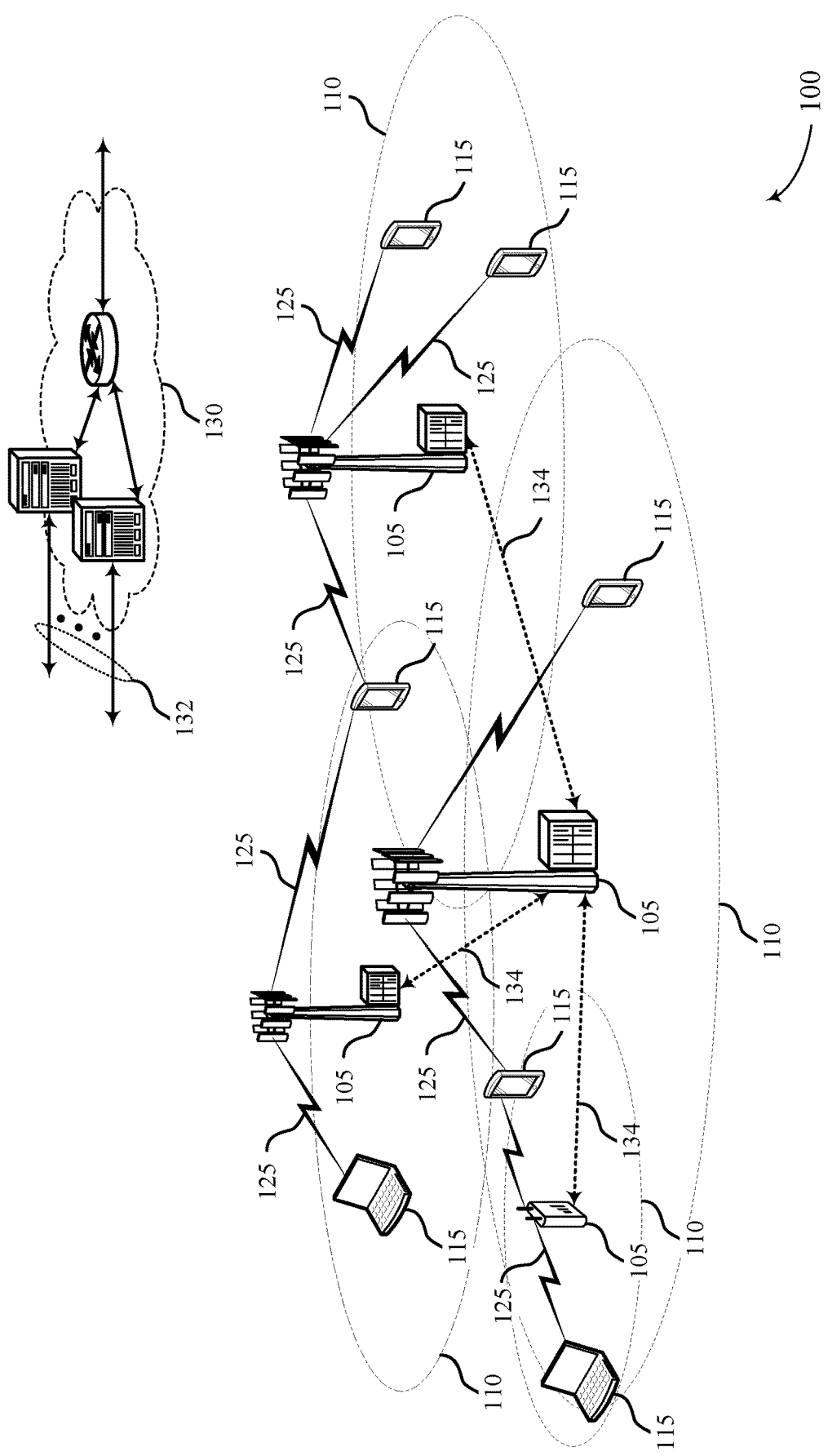
FIG. 1 illustrates an example of a system for wireless communications that supports user equipment (UE) specific beamforming for narrowband communications in accordance with aspects of the present disclosure.

FIG. 1 illustrates an example of a wireless communications system 100 that supports UE specific beamforming for narrowband communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support NB-IoT devices. One or more UEs 115 may be such narrowband devices that may utilize relatively narrow transmission bandwidths for communications, and may be low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125. Communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (i.e., a mode that supports one-way communication via transmission or reception, but not transmission and reception simultaneously). In some examples half-duplex communications may be performed at a reduced peak rate. Other power conservation techniques for UEs 115 may include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device may be equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming or precoding weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

In some cases, the antennas of a base station 105 or UE 115 may be located within one or more antenna arrays, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or of a core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth for non-narrowband devices may be one of a number of predetermined bandwidths for carriers of a particular radio access technology (e.g., 1.4, 3, 5, 10, 15, 20, 40, or 80 MHz). In some examples, one or more UEs 115 may be narrowband devices and may be configured for operating over portions of the wideband carrier bandwidth. Such a device, for example, may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

As indicated above, one or more UEs 115 may be narrowband devices that may be configured for beamforming of narrowband communications. In some cases, a UE 115 may provide an indication to a base station 105 that the UE 115 is a narrowband device that is capable of performing beamforming. Such an indication may be provided in response to the UE 115 receiving a non-beamformed NPBCH transmission from a base station 105 on a first carrier. The base station 105 may receive the indication and configure the UE 115 with a beamformed narrowband communications scheme. Such a beamformed narrowband communications scheme may be used for NPDCSH communications, NPDCCH communications, or combinations thereof. In some cases, beamformed communications may be configured on a different carrier than the first carrier. The base station 105 and UE 115 may then communicate using beamformed transmissions, which may provide more efficient and more reliable communications than non-beamformed transmissions.

Figure 2:
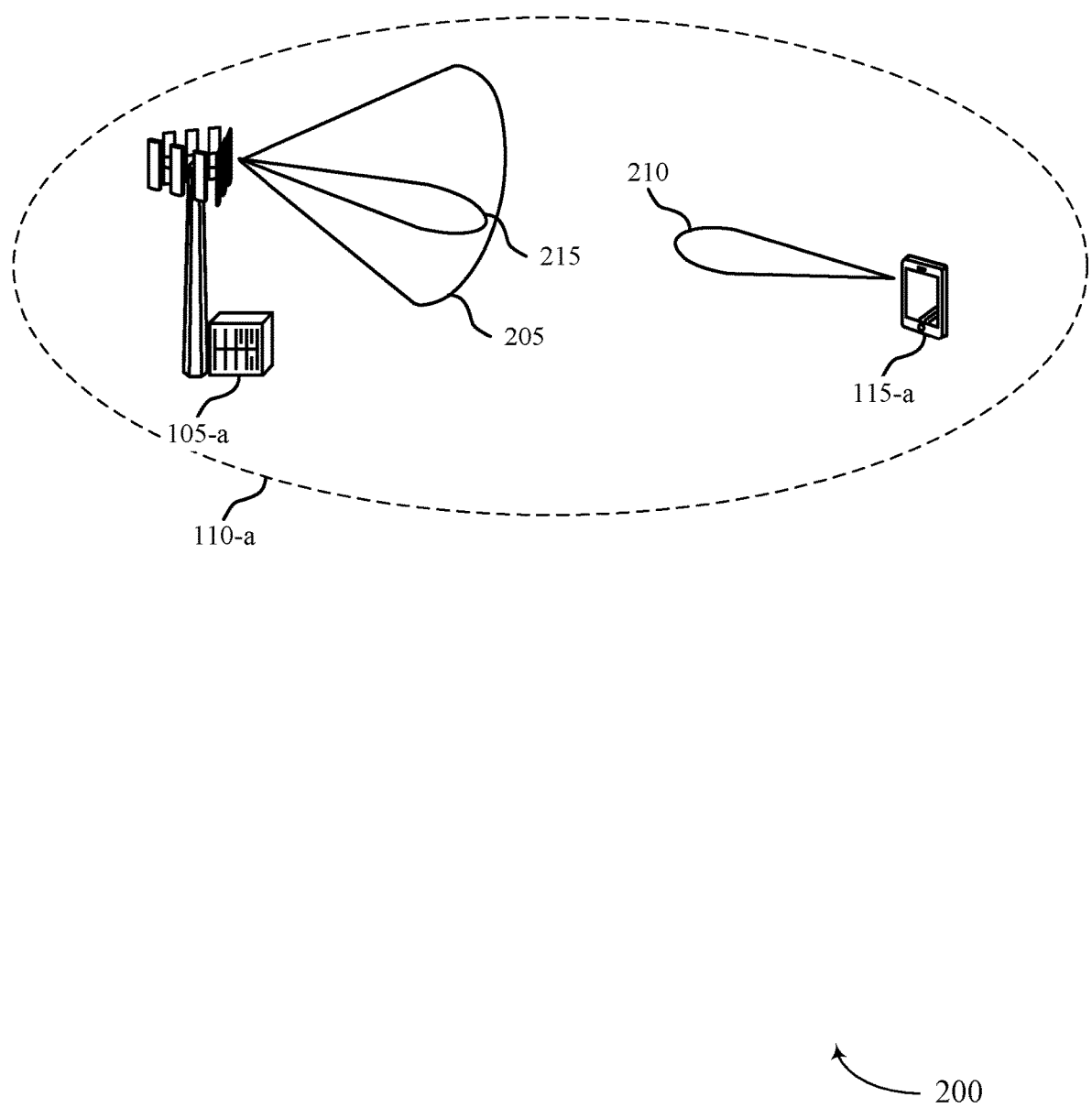
FIG. 2 illustrates an example of a portion of a wireless communications system that supports UE specific beamforming for narrowband communications in accordance with aspects of the present disclosure.

FIG. 2 illustrates an example of a wireless communications system 200 that supports UE specific beamforming for narrowband communications in accordance with aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic area 110-a. Base station 105-a and UE 115-a may communicate using beamformed or directional transmissions, and non-beamformed transmissions. For example, in downlink communications, base station 105-a may transmit downlink transmissions to UE 115-a using non-beamformed downlink transmissions 205 (e.g., using non-precoded transmissions over an antenna array that may provide coverage to a portion of geographic area 110-a. In such cases, the antenna ports of such NB-IoT devices are tied up to the same ports used for NPBCH. The number of NRS ports may be either one or two, and in the case of two ports, space frequency block coding (SFBC) based transmission diversity may be used for NPDCCH/NPDSCH transmissions. Further, NPDCCH and NPDSCH may have the same antenna ports and transmission scheme. The base station 105-a may also transmit beamformed downlink transmissions to UE 115-a using beamformed downlink transmissions beams 215, and UE 115-a may receive the downlink transmissions using downlink reception beam 210.

In the example of FIG. 2, the UE 115-a may be a narrowband device that may be capable of beamforming. In cases where TDD is used for communications, uplink transmissions and downlink transmissions may be on the same carrier and channel reciprocity may be applicable and beamforming/precoding parameters may be determined by the base station 105-a that may be used for both uplink and downlink transmissions. In some cases, frequency division duplexing may be used for communications, and the UE 115-a may provide to feedback CSI, such as PMI, to indicate preferred precoding vectors. In some cases, base station 105-a and UE 115-a may also use one or more coverage enhancement techniques (e.g., based on repetitions, TTI bundling, power boosting, or combinations thereof), and beamforming may also be used in conjunction therewith to further enhance coverage.

In some cases, when base station 105-a is serving devices that are not capable of beamforming, NRS transmissions may not be precoded in order to allow these devices to perform downlink measurements on the NRS. In some cases, an anchor carrier, or a first carrier, may use non-beamformed transmissions, and a second carrier may use beamformed transmissions. In such a manner, a device that is capable of beamforming, such as UE 115-a, may use beamforming on the second carrier (e.g., for NPDSCH transmissions) while using non-beamformed transmissions on the first carrier. In such cases, a precoded NRS may be transmitted on the second carrier that may be used for measurements related to beamforming/precoding. In some cases, the precoded NRS may also be provided in transmissions of the first carrier that are invalid subframes (e.g., the base station 105-a may advertise certain NB-IoT downlink subframes as invalid subframes where NRS does not exist). A device that is not capable of beamforming may ignore such subframes, while a device that is capable of beamforming may receive NPDSCH/NPDCCH transmissions and a precoded NRS in such subframes. Transmission and measurements of precoded NRS transmissions will be discussed in more detail below.

In some cases, the base station 105-a may configure NPDCCH and NPDSCH independently. For example, a non-beamformed NRS-based scheme may be used for NPDCCH, and precoded NRS based beamforming may be used for NPDSCH. Further, in some cases, beamforming may be configured for both NPDCCH and NPDSCH, but the transmission scheme may be different (e.g., single port precoded NRS for NPDCCH and two ports diversity transmission for NPDSCH). In some cases, for NPDSCH, configuration information provided by the base station 105-a may configure beamformed communications, and DCI may enable or disable UE specific beamforming for the scheduled NPDSCH transmissions. In cases where precoded NRS is used for beamforming, such a reference signal may act as a UE-specific reference signal (UERS). In such cases, the precoded NRS has a same structure as non-precoded NRS, and the base station 105-a may also configure a restriction on cross-subframe channel estimation for NRS, due to potential phase jumps occurring across subframes. In cases where beamforming is configured for NPDSCH, NPDCCH can be configured on a different carrier with the non-precoded NRS based transmission scheme for NPDCCH, and performance degradation due to the limitation on cross-subframe channel estimation for precoded NRS or UERS can be avoided for NPDCCH. In cases where NPDCCH and NPDSCH are configured on the same carrier when using the non-precoded NRS based transmission scheme for NPDCCH, beamforming can be used for the scheduled NPDSCH only when not overlapping with an NPDCCH search space. In some cases, a beamformed narrowband communications scheme (e.g., a beamforming configuration for narrowband communications) may be independently configured for NPDCCH and NPDSCH.

When transmitting a UERS, such as a precoded NRS that is transmitted to the UE 115-a, a single port transmission scheme may be configured, or a two-port transmission scheme may be configured. For single port transmission schemes, the UE 115-a is only required to receive one UERS/precoded NRS port for channel estimation. In cases where two port diversity transmission is used, the UE 115-a may perform channel estimation for two UERS/precoded NRS ports and then combine the signals from both UERS/precoded NRS ports for decoding NPDSCH. In some cases, for two port diversity transmission, the combining and decoding may be SFBC or per-RE level co-phase cycling. In cases where SFBC is used, an SFBC precoding matrix may be provided that may be the same as that of non-beamformed 2-port NRS. In cases where per-RE level co-phase cycling is used, the UE 115-a may assume the precoding operation for precoded NRS and data defined by:

$p_{precoded} = W_1$ and $d_{precoded} = W_1 \cdot W_2(i)$, with $$W_2(i) = \left\{ \begin{bmatrix} 1 \\ e^{j\frac{\pi}{2}i} \end{bmatrix} \right\}, i = 0, 1, 2, 3$$

and i is RE index.

Therefore the UE 115-a may combine the signals from both precoded NRS ports by multiplying per-RE level transforming matrix $W_2(i)$ for decoding NPDSCH. In some cases, the transmission scheme, including using single port or two ports, for UE-specific beamforming may be semi-statically configured by RRC or dynamically configured by DCI. In some cases, the configuration information includes a first number of antenna ports for the beamformed narrowband communication scheme that may be different than a second number of antenna ports for the NPBCH communications scheme. The beamformed narrowband downlink shared channel communications or narrowband downlink control channel communications may be received via the first number of antenna ports.

Figure 3A:
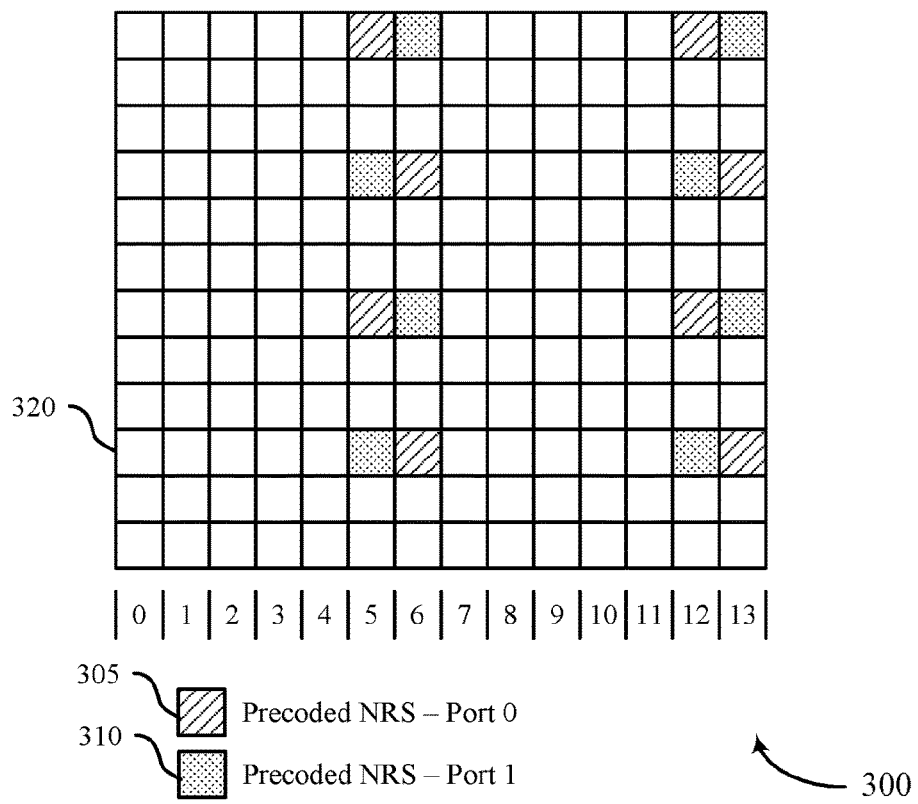
FIG. 3A illustrates an example of reference signal resources that support UE specific beamforming for narrowband communications in accordance with aspects of the present disclosure.
Figure 3B:
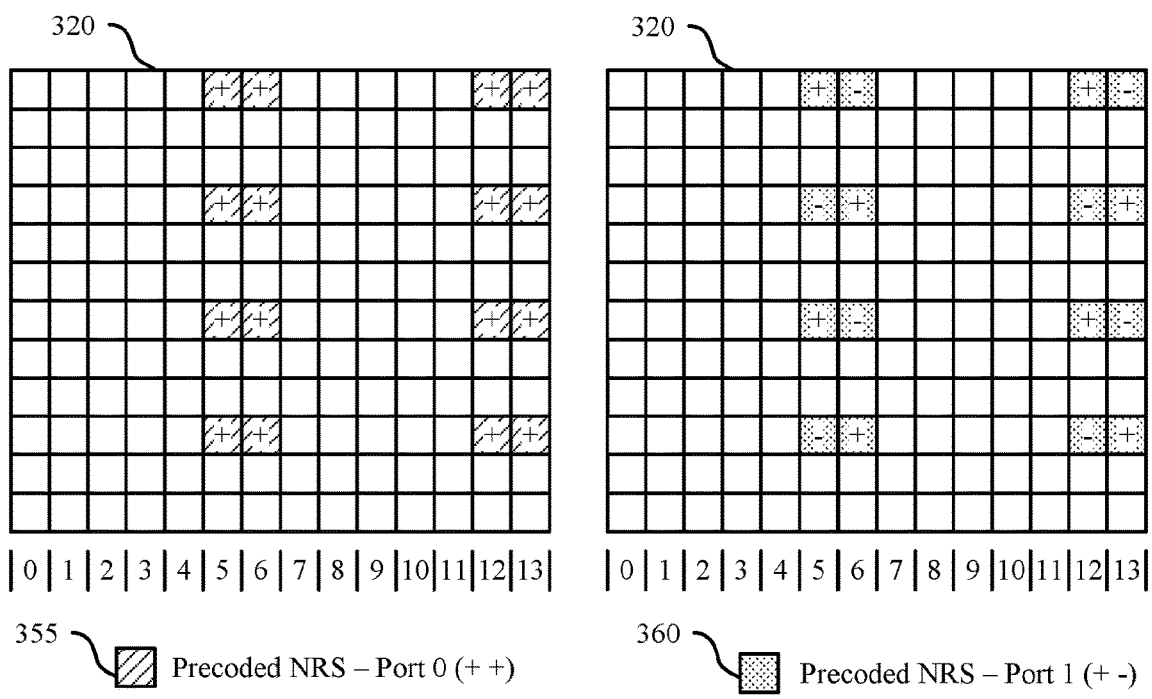
FIG. 3B illustrates another example of reference signal resources that support UE specific beamforming for narrowband communications in accordance with aspects of the present disclosure.

FIGS. 3A and 3B illustrate examples of reference signal resources 300 and 350 that support UE specific beamforming for narrowband communications in accordance with aspects of the present disclosure. In some examples, reference signal resources 300 may be implemented in aspects of wireless communications system 100 or 200. In some cases, if MU-MIMO is supported for beamforming, additional reference signal ports (e.g., UERS or precoded NRS ports) may be configured for the co-scheduling UE. The reference signal ports of different UEs may be orthogonally multiplexed using either frequency division multiplexing (FDM) or code division multiplexing (CDM).

FIG. 3A illustrates reference signal resources 300 for FDM, with resources 305 configured for precoded NRS port 0, and resources 310 configured for precoded NRS port 1. In cases where FDM is used for MU-MIMO, DCI may be used to signal also whether another precoded NRS port is presented in the subframe for RE mapping of NPDSCH. FIG. 3B illustrates reference signal resources 350 for CDM, with resources 355 configured for precoded NRS port 0, and resources 360 configured for precoded NRS port 1. In some cases, to reduce the DCI overhead, FDM may be used for SU-MIMO and CDM for MU-MIMO. In some cases, a base station may include an indication in configuration information of UE specific beamforming that indicates whether SU-MIMO or MU-MIMO is configured for narrowband transmissions, which the UE may use to determine the precoded NRS pattern. As illustrated in FIGS. 3A and 3B, resources 305, 310, 355, or 360 used for NRS may be transmitted as part of an NPDSCH transmission, with NPDSCH mapped to other resources 320 of the illustrated resources. That is, the NPDSCH may be rate matched around resources 305, 310, 355, or 360 (e.g., the NPDSCH may have null resources corresponding to resources 305, 310, 355, or 360).

Reference signals transmitted in the reference signal resources may be measured by a UE and the measurements, and in some cases a preferred beam or PMI, may be transmitted to the base station. In some cases, in order to reduce a number of measurements associated with reference signal transmissions, aperiodic reference signal processes may be configured, as discussed in more detail with respect to FIGS. 4 and 5.

Figure 4:
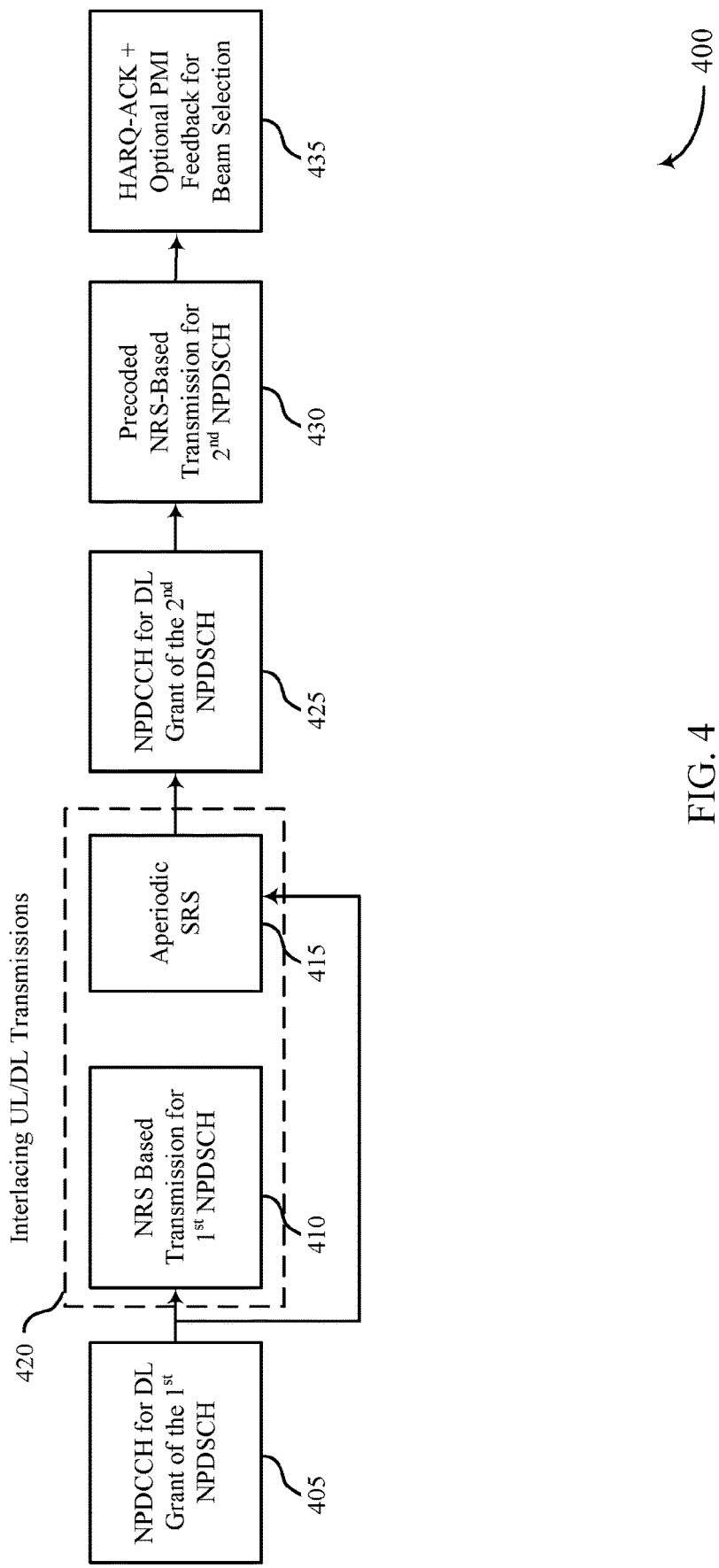
FIG. 4 illustrates an example of aperiodic sounding reference signal based on channel state information (CSI)

FIG. 4 illustrates an example of aperiodic SRS based on CSI feedback 400 that supports UE specific beamforming for narrowband communications in accordance with aspects of the present disclosure. In some examples, aperiodic SRS based on CSI feedback 400 may be implemented in aspects of wireless communications system 100 or 200. In some cases, UE power consumption associated with periodic reference signal measurements may be relatively high, and aperiodic measurements may be implemented.

In the example of FIG. 4, the base station may transmit an NPDCCH transmission with a downlink grant for a first NPDSCH transmission, as indicated at 405. In some cases, the downlink grant (or uplink grant) may be provided in DCI, which may also trigger aperiodic SRS. Then, from SRS measurements the NB-IoT base station may determine one or multiple precoding vectors. If a precoded NRS (or UERS) is precoded by cycling over multiple precoding vectors, the UE may further provide feedback for the preferred beam to refine precoding for subsequent NPDSCH transmissions.

In this example, the UE may receive a first NPDSCH transmission via a non-precoded NRS-based transmission, as indicated at 410. The UE may transmit an aperiodic SRS transmission, as indicated at 415. In some cases, iterating uplink and downlink TDD transmissions may include a number of NPDSCH transmissions and SRS transmissions, as indicated at 420. The base station may identify a precoding vector, which may be indicated in an NPDCCH downlink grant for a second NPDSCH transmission, as indicated at 425. The precoded NRS based transmission of the second NPDSCH transmission may be transmitted by the base station, as indicated at 430, which the UE may receive using precoding indicated in the second grant information. The UE may decode the received transmission in accordance with the transmission scheme used for the transmission (e.g., based on SFBC or per-RE level phase co-cycling). The UE may determine HARQ ACK/NACK feedback, which may be provided to the base station as indicated at 435. In some cases, a number of different precoding vectors may be used for precoded NRS transmissions, which may be measured at the UE to identify a preferred beam, which may be provided as feedback to the base station to further refine NRS precoding for subsequent NPDSCH transmissions, as also indicated at 435.

In some cases, the base station may configure a set of the resources for ACK/NACK transmissions, and the UE may select one resource based on a preferred beam index. In such cases, the base station may configure certain ACK/NACK resources to correspond to a particular beam index associated with a particular precoded NRS. The UE may then select the ACK/NACK resource that corresponds to the preferred beam at the UE. In some cases, the resource of ACK/NACK transmission may be a subcarrier offset (e.g., offset values are {0, −1, −2, −3, −4, −5, −6, −7} in the case of 8 precoded NRS beams). Such techniques may allow the UE to provide feedback of a preferred beam index without an increase in the uplink feedback overhead.

FIG. 5 illustrates an example of aperiodic CSI reference signal (CSI-RS) based feedback 500 that supports UE specific beamforming for narrowband communications in accordance with aspects of the present disclosure. In some examples, aperiodic CSI-RS feedback 500 may implement aspects of wireless communications system 100 or 200. Similarly as discussed above, in some cases UE power consumption associated with periodic reference signal measurements may be relatively high, and aperiodic CSI-RS measurements may be implemented.

In the example of FIG. 5, the base station may transmit an NPDCCH transmission with a downlink grant for a first NPDSCH transmission, as indicated at 505. In some cases, the downlink grant (or uplink grant) may be provided in DCI, which may also trigger aperiodic CSI-RS transmission. The UE may receive a first NPDSCH transmission via a non-precoded NRS-based transmission, as indicated at 510. The UE may measure a number of aperiodic CSI-RS transmissions, as indicated at 515. The RE locations/subframes for the precoded CSI-RS and the total number of CSI-RS beams, in some cases, are configured by the base station. The precoded CSI-RS may be transmitted with the scheduled NPDSCH using the null NPDSCH tones or resource elements. In some cases, null tones or resource elements may refer to tones or resource elements that may not be used for transmissions. For example, null PDSCH tones may refer to tones not used for PDSCH transmission; e.g., tones that may be used for puncturing or rate matching PDSCH for CSI-RS transmission. In some cases, the precoded CSI-RS may be repeated over a block of consecutive N subframes for improving measurement accuracy. Each precoded CSI-RS may be 1-port. In some cases, a scheduled NPDSCH communication may include a number of subframes with multiple NPDSCH transmissions and CSI-RS transmissions, as indicated at 520. The UE may determine HARQ ACK/NACK feedback, and in some cases, may identify a preferred beam/precoding vector, which may be transmitted to the base station, as indicated at 525. Similarly as discussed above, in some cases the base station may configure a set of the resources for ACK/NACK transmissions, and the UE may select one resource based on a preferred beam index.

An NPDCCH with a second downlink grant may be provided by the base station at 530. The second downlink grant may indicate a precoding vector that is used for the corresponding downlink NPDSCH transmission. The UE may receive the second NPDSCH transmission based on a precoded NRS based transmission, as indicated at 535. The UE may decode the received transmission in accordance with the transmission scheme used for the transmission (e.g., based on SFBC or per-RE level phase co-cycling). The UE may again determine HARQ ACK/NACK feedback, which may be provided to the base station.

FIG. 6 illustrates an example of a precoder cycling 600 that supports UE specific beamforming for narrowband communications in accordance with aspects of the present disclosure. In some examples, precoder cycling 600 may be implemented in aspects of wireless communications system 100 or 200. As discussed above, precoded NRS transmissions may be provided by a base station, in which different precoding may be used for different transmission subframes. Such beam cycling over subframes may be applied for precoded NRS based transmissions to achieve both channel estimation accuracy and precoder diversity gain. In some cases, for non-precoded NRS based transmissions, a UE may assume NRS is not changed over subframes, such that there is not a phase jump. However, for precoded NRS based transmissions, there is potential for phase jumps due to precoding changes. In such cases, a UE needs to know the location of the phase jump to reset channel estimation.

In the example of FIG. 6, an NPDCCH transmission 605 may provide information for precoder cycling and for an NPDSCH transmission duration 615. In some cases, a default precoding cycling granularity 610 may be configured to be X subframes. In such cases, X is the number of consecutive subframes (e.g., based on absolute SFN) that a same precoding is used for precoded NRS transmissions, and a same precoding matrix is assumed per antenna port for X consecutive subframes. The precoding matrix may vary from one set of X subframes to another set of X subframes. In some cases, without further indication by DCI, UE may use X subframes for UERS/precoded NRS channel estimation with no assumption whether the precoding is changed from one set of X subframes to another set of X subframes. The DCI may also indicate the change of precoding cycling granularity for the scheduled NPDSCH by signaling the number of precoders or beams for precoder cycling. The UE may then determine the precoding cycling based on absolute SFN, subframe number, X, the configured number of precoders or beams, the total number of transmission subframes for the scheduled NPDSCH, or a combination of these parameters. For example, the granularity may change to an integer multiple of X subframes. In this example, an initial beam 620 (beam #0) may use a first precoding from a start of NPDSCH transmissions and for a subsequent set of X subframes. A second beam 625 (beam #1) may be used for two sets of X subframes, followed by a third beam 630 (beam #2) and a fourth beam 635 (beam #3) that are each used for one set of X subframes. In some cases, the DCI may provide an indication of the change of precoding cycling granularity that indicates that the UE is to use non-precoded NRS for a scheduled narrowband downlink shared channel, and thus such DCI may indicate a fallback to the non-beamformed transmissions. In some cases, the UE will assume the fallback to the non-beamformed transmission for the scheduled NPDSCH when transmission is overlapping with an NPDCCH search space which may be a periodical block of subframes configured by a higher layer. In such cases, the non-beamformed transmission is used for NPDCCH.

FIG. 7 illustrates an example of a process flow 700 that supports UE specific beamforming for narrowband communications in accordance with aspects of the present disclosure. In some examples, process flow 700 may implement aspects of wireless communications system 100 or 200. In some examples, process flow 700 may be implemented by a UE, such as a UE 115 of FIG. 1 or 2.

At 705, the UE may receive a broadcast transmission with system information. For example, the UE may receive an NPBCH transmission that provides synchronization and timing information that may be used for establishing a connection with a base station. The broadcast transmission may be received via a first carrier according to a non-precoded transmission scheme.

At 710, the UE may transmit a capability indication to the base station. In some cases, the capability indication may be provided to the base station as part of a connection establishment procedure when the UE is establishing a connection with the base station. In some cases, such a connection establishment may be an initial connection establishment with the base station. In other cases, such a connection establishment may be a reestablishment of a prior connection or a reconfiguration of an existing connection between the UE and the base station. In some cases, the indication of the UE capability may be an explicit indication of capability (e.g., in an IE within a capability indication message) to the base station. In other cases, the UE capability may be inferred from a UE category or UE class that may be transmitted to the base station.

At 715, the UE may determine whether a received configuration from the base station initiates beamforming. In some cases, the base station may provide configuration information via RRC signaling to the UE, which may configure beamformed transmissions. If the UE determines that such configuration information does not include beamforming configuration information, the UE may use a non-beamformed communications scheme, as indicated at 720.

If the UE determines at 715 that the configuration information does indicate a beamformed communications scheme the UE may, at 725, transmit or receive precoded reference signals using different precoding. In some cases, TDD communications may be implemented, and the UE may transmit SRS transmissions to the base station for determining different precoding. In cases that use FDD communication, the UE may receive precoded CSI-RS transmission and preform CSI measurements on the transmissions. The UE may provide CSI measurement reports to the base station, and in some cases may also indicate a preferred beam or precoding to the base station. In some cases, the preferred beam may be indicated based on an ACK/NACK resource used for a HARQ ACK/NACK transmission that is transmitted to the base station. In some cases, as discussed above, precoding cycling may be used, and the UE may determine a change of precoding matrix for a subframe is based at least in part on a subframe number, the default precoding cycling granularity, a configured number of precoders or beams, or a total number of transmission subframes for the scheduled narrowband downlink shared channel. The UE may use the determined precoding granularity to receive a precoded NRS.

At 730, the UE may determine precoding for NPDSCH transmissions, NPDCCH transmissions, or both. In some cases, the precoded NRS may be transmitted via a single port. In some cases, the precoded NRS may be transmitted via two antenna ports. In the case of two antenna ports, UE may combine the signals from both antenna ports for decoding NPDCCH/NPDSCH.

At 735, the UE may use a beamformed communications scheme for NPDSCH transmission, NPDCCH transmissions, or combinations thereof. As indicated above, in some cases, the precoding used for subsequent downlink transmissions may be indicated in the DCI with a downlink grant. In some cases, the beamformed downlink transmissions may be received on a second carrier that is different than a first carrier that is used to transmit NPBCH.

FIG. 8 illustrates an example of a process flow 800 that supports UE specific beamforming for narrowband communications in accordance with aspects of the present disclosure. In some examples, process flow 800 may implement aspects of wireless communications system 100 or 200. In some examples, process flow 800 may be implemented by a base station, such as a base station 105 of FIG. 1 or 2.

At 805, the base station may transmit a broadcast communication with system information. For example, the base station may transmit an NPBCH that provides synchronization and timing information that may be used for establishing a connection with a base station. The NPBCH may be transmitted via a first carrier according to a non-precoded transmission scheme.

At 810, the base station may receive a connection establishment request from a UE. In some cases, the request may be part of a connection establishment procedure when the base station is establishing a connection with the UE. In some cases, such a connection establishment may be an initial connection establishment with the UE. In other cases, such a connection establishment may be a reestablishment of a prior connection or a reconfiguration of an existing connection between the base station and the UE.

At 815, the base station may determine whether the UE has a capability of beamforming. As indicated above, such a determination may be made based on the received UE capability indication. In some cases, the capability indication may be provided to the base station as part of the connection establishment procedure. In some cases, the indication of the UE capability may be an explicit indication of capability (e.g., in an IE within a capability indication message) to the base station. In other cases, the UE capability may be inferred from a UE category or UE class that may be transmitted to the base station. If the base station determines that the UE does not indicate a beamforming capability, the base station may configure a non-beamformed communications scheme, as indicated at 820.

If the base station determines at 815 that the configuration information does indicate a beamformed communications capability, the base station, at 825, may configure a beamformed communications scheme. In some cases, the beamformed communications scheme may be configured by RRC signaling, and the base station may, in some cases, provide precoding information for precoded transmissions, that may be used by the UE and the base station for beamformed communications. In some cases, the base station may configure the UE to provide aperiodic measurement reports from which beam or precoding parameters may be selected. In some cases, the base station may configure ACK/NACK resources such that different ACK/NACK resources are associated with different beams, and an indication ACK/NACK via a particular resource may indicate which beam is preferred at the UE.

At 830, the base station may trigger aperiodic SRS transmissions or measurements for different precoded reference signals. In some cases, TDD communications may be implemented, and the UE may transmit SRS transmissions to the base station for determining precoding vectors. In cases that use FDD communication, the base station may transmit precoded CSI-RSs and the UE may preform CSI measurements on the transmissions. The UE may provide CSI measurement reports to the base station, and in some cases may also indicate a preferred beam or precoding to the base station (e.g., via selection of a configured ACK/NACK resources as discussed above). In some cases, as discussed above, precoding cycling may be used, and the base station may determine a change of precoding matrix for a subframe may be based at least in part on a subframe number, the default precoding cycling granularity, a configured number of precoders or beams, or a total number of transmission subframes for the scheduled narrowband downlink shared channel. The base station may use the determined precoding granularity to transmit a precoded NRS.

At 835, the base station may determine precoding for NPDSCH transmissions, NPDCCH transmissions, or both. In some cases, the precoding for NPDSCH and NPDCCH may be the same or different (i.e., using different number of NRS ports). In some cases, the DCI may also indicate the number of NRS ports for one or more subsequent NPDSCH transmissions, which may be the same precoding as NPDCCH transmissions, or may be different than NPDCCH precoding.

At 840, the base station may use a beamformed communications scheme for NPDSCH transmission, NPDCCH transmissions, or combinations thereof. As indicated above, in some cases, the beamforming downlink transmission used for NPDSCH may be indicated in the DCI with a downlink grant. In some cases, the beamformed downlink transmissions may be transmitted on a second carrier that is different than a first carrier that may be used to transmit NPBCH.

FIG. 9 shows a block diagram 900 of a device 905 that supports UE specific beamforming for narrowband communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to UE specific beamforming for narrowband communications). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, via a first carrier, an NPBCH transmission from a base station according to an NPBCH communications scheme, transmit, responsive to the NPBCH transmission, an indication to the base station of a UE capability to support beamformed transmissions for narrowband downlink communications from the base station, receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receive the one or more beamformed narrowband downlink shared channel communications or narrowband downlink control channel communications based on the beamformed narrowband communications scheme. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

FIG. 10 shows a block diagram 1000 of a device 1005 that supports UE specific beamforming for narrowband communications in accordance with aspects of the present disclosure. The device 1005 may be an example of aspects of a device 905 or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to UE specific beamforming for narrowband communications). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment manager 1020, a capability indication component 1025, a beamforming configuration manager 1030, and a receive beam manager 1035. The communications manager 1015 may be an example of aspects of the communications manager 1210 described herein.

The connection establishment manager 1020 may receive, via a first carrier, an NPBCH transmission from a base station according to an NPBCH communications scheme. In some cases, the NPBCH communications scheme may be a non-beamformed communications scheme, and a first carrier may carry NPBCH communications.

The capability indication component 1025 may transmit, responsive to the NPBCH transmission, an indication to the base station of a UE capability to support beamformed transmissions for narrowband downlink communications from the base station. In some cases, UEs may transmit an explicit indication of capability (e.g., in an IE within a capability indication message) to the base station. In other cases, the UE capability may be inferred from a UE category or UE class that may be transmitted to the base station.

The beamforming configuration manager 1030 may receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier.

The receive beam manager 1035 may receive one or more beamformed narrowband downlink shared channel communications or narrowband downlink control channel communications based on the beamformed narrowband communications scheme. In some cases, the one or more beamformed narrowband downlink shared channel communications or narrowband downlink control channel communications may include beamformed communications via a second carrier that is different than the first carrier of the NPBCH transmission.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

FIG. 11 shows a block diagram 1100 of a communications manager 1105 that supports UE specific beamforming for narrowband communications in accordance with aspects of the present disclosure. The communications manager 1105 may be an example of aspects of a communications manager 915, a communications manager 1015, or a communications manager 1210 as described herein. The communications manager 1105 may include a connection establishment manager 1110, a capability indication component 1115, a beamforming configuration manager 1120, a decoder 1125, a reference signal manager 1130, a DCI component 1135, and a CSI feedback component 1140. Each of these modules may communicate, directly or indirectly, with one another (e.g., via one or more buses).

The connection establishment manager 1110 may receive, via a first carrier, an NPBCH transmission 1150 from a base station according to an NPBCH communications scheme. In some cases, connection establishment manager 1110 may provide an indication 1155 of the NPBCH transmission (or the NPBCH transmission 1150) to a capability indication component 1115.

The capability indication component 1115 may transmit, responsive to the NPBCH transmission, an indication 1160 to the base station of a UE capability to support beamformed transmissions for narrowband downlink communications from the base station.

The beamforming configuration manager 1120 may receive, from the base station, configuration information 1165 indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier. In some examples, the beamforming configuration manager 1120 may determine a reference signal pattern based on the indication of MU-MIMO or SU-MIMO. In some examples, the beamforming configuration manager 1120 may receive second configuration information 1165 indicating the narrowband downlink control channel may be on the first carrier, and where the beamformed narrowband communications scheme may be used only for the narrowband downlink shared channel communications.

In some cases, the configuration information 1165 includes a default precoding cycling granularity for the precoded NRS that indicates a number of subframes between precoding changes for the precoded NRS. In some cases, the precoded NRS transmission of a single antenna port or two antenna ports may be independently configured for the narrowband downlink control channel and the narrowband downlink shared channel. In some cases, the configuration information 1165 includes a first number of antenna ports for the beamformed narrowband communications scheme that is different than a second number of antenna ports for the NPBCH communications scheme.

In some cases, beamforming configuration manager 1120 may provide some or all of the configuration information 1165 (e.g., via beamforming parameters 1166) to a decoder 1125. In some cases, beamforming configuration manager 1120 may configure (e.g., via beamforming parameters 1166) decoder 1125 to receive beamformed narrowband downlink shared channel communications or narrowband downlink control channel communications based on the beamformed narrowband communications scheme.

Decoder 1125 may receive one or more beamformed narrowband downlink shared channel communications 1170 or narrowband downlink control channel communications 1170 based on the beamformed narrowband communications scheme. In some cases, the one or more beamformed narrowband downlink shared channel communications 1170 or narrowband downlink control channel communications 1170 are received via one or two antenna ports. In some cases, the one or more beamformed narrowband downlink shared channel communications 1170 or narrowband downlink control channel communications 1170 are received via the first number of antenna ports.

Decoder 1125 may receive one or more precoded NRS transmissions 1185. The decoder 1125 may measure the one or more precoded NRS transmissions 1185 based on the default precoding cycling granularity (e.g., included in configuration information 1165), and where cross-subframe channel estimation may be restricted. In some cases, the one or more precoded NRS transmissions are received via a single antenna port. In some cases, the one or more precoded NRS transmissions are received via two antenna ports. In some cases, the beamformed narrowband communications scheme may be based on a precoded NRS, and the NPBCH communications scheme uses a non-precoded NRS.

Decoder 1125 may combine received signals (e.g., beamformed narrowband downlink shared channel communications 1170, narrowband downlink control channel communications 1170, or precoded NRS transmissions 1185) from each of the two antenna ports. In some examples, the decoder 1125 may decode the beamformed narrowband downlink shared channel communications or narrowband downlink control channel communications based on the combined received signals. For example, the decoder 1125 may combine the one or more precoded NRS transmissions received via two antenna ports and use channel estimation of the combined one or more precoded NRS transmissions for decoding the beamformed narrowband downlink shared channel communications or narrowband downlink control channel communications. In some cases, the decoding may be based on SFBC or per-RE level co-phase cycling. In some cases, decoder 1125 may output decoded beamformed narrowband downlink shared channel communications or narrowband downlink control channel communications 1199.

The reference signal manager 1130 may receive a trigger 1175 to perform an aperiodic SRS transmission. In some examples, the reference signal manager 1130 may transmit the SRS 1180 to the base station responsive to the trigger.

The DCI component 1135 may receive DCI 1190 that indicates a change of precoding cycling granularity for a scheduled narrowband downlink shared channel, and where a change of precoding matrix for a subframe may be based on one or more of a subframe number, the default precoding cycling granularity, a configured number of precoders or beams, or a total number of transmission subframes scheduled for the narrowband downlink shared channel. In some cases, the change of precoding cycling granularity indicates that a non-precoded NRS may be used for the scheduled narrowband downlink shared channel. In some cases, DCI component 1135 may provide control information 1191 (e.g., an indication of a change of precoding cycling granularity) to beamforming configuration manager 1120 and/or to decoder 1125.

The CSI feedback component 1140 may receive a trigger 1195 to perform an aperiodic CSI measurement. In some examples, the CSI feedback component 1140 may measure one or more reference signal transmissions (e.g., one or more precoded NRS transmissions) from the base station responsive to the trigger. In some examples, the CSI feedback component 1140 may transmit a CSI measurement report 1197 to the base station based on the measuring. In some cases, the measuring includes determining which of the set of precoded reference signals is preferred. In some cases, the set of precoded reference signals may be transmitted using the null resource elements of the narrowband downlink shared channel.

FIG. 12 shows a diagram of a system 1200 including a device 1205 that supports UE specific beamforming for narrowband communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, via a first carrier, an NPBCH transmission from a base station according to an NPBCH communications scheme, transmit, responsive to the NPBCH transmission, an indication to the base station of a UE capability to support beamformed transmissions for narrowband downlink communications from the base station, receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier, and receive the one or more beamformed narrowband downlink shared channel communications or narrowband downlink control channel communications based on the beamformed narrowband communications scheme.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read only memory ROM. The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting UE specific beamforming for narrowband communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a block diagram 1300 of a device 1305 that supports UE specific beamforming for narrowband communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to UE specific beamforming for narrowband communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, via a first carrier, an NPBCH communication according to an NPBCH communications scheme, receive, responsive to the NPBCH communication, an indication from a UE that indicates a UE capability to support beamformed communications for narrowband downlink communications from the base station, determine, based on the indication of the UE capability, a beamformed narrowband communications scheme for one or more of narrowband downlink shared channel communications or narrowband downlink control channel communications to the UE, transmit, to the UE, configuration information indicating the beamformed narrowband communications scheme, where the one or more beamformed narrowband downlink shared channel communications or narrowband downlink control channel communications may be configured on a different carrier than the NPBCH, and communicate with the UE based on the beamformed narrowband communications scheme. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

FIG. 14 shows a block diagram 1400 of a device 1405 that supports UE specific beamforming for narrowband communications in accordance with aspects of the present disclosure. The device 1405 may be an example of aspects of a device 1305 or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to UE specific beamforming for narrowband communications). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a connection establishment manager 1420, a capability indication component 1425, a beamforming configuration manager 1430, and a transmission beam manager 1435. The communications manager 1415 may be an example of aspects of the communications manager 1610 described herein.

The connection establishment manager 1420 may transmit, via a first carrier, an NPBCH communication according to an NPBCH communications scheme. In some cases, the NPBCH communications scheme may be a non-beamformed communications scheme, and a first carrier may carry NPBCH communications.

The capability indication component 1425 may receive, responsive to the NPBCH communication, an indication from a UE that indicates a UE capability to support beamformed communications for narrowband downlink communications from the base station. In some cases, UEs may transmit an explicit indication of capability (e.g., in an IE within a capability indication message) to the base station. In other cases, the UE capability may be inferred from a UE category or UE class that may be transmitted to the base station.

The beamforming configuration manager 1430 may determine, based on the indication of the UE capability, a beamformed narrowband communications scheme for one or more of narrowband downlink shared channel communications or narrowband downlink control channel communications to the UE and transmit, to the UE, configuration information indicating the beamformed narrowband communications scheme, where the one or more beamformed narrowband downlink shared channel communications or narrowband downlink control channel communications may be configured on a different carrier than the NPBCH.

The transmission beam manager 1435 may communicate with the UE based on the beamformed narrowband communications scheme.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

FIG. 15 shows a block diagram 1500 of a communications manager 1505 that supports UE specific beamforming for narrowband communications in accordance with aspects of the present disclosure. The communications manager 1505 may be an example of aspects of a communications manager 1315, a communications manager 1415, or a communications manager 1610 described herein. The communications manager 1505 may include a connection establishment manager 1510, a capability indication component 1515, a beamforming configuration manager 1520, a transmission beam manager 1525, a reference signal manager 1530, a DCI component 1535, and a CSI feedback component 1540. Each of these modules may communicate, directly or indirectly, with one another (e.g., via one or more buses).

The connection establishment manager 1510 may transmit, via a first carrier, an NPBCH communication 1545 according to an NPBCH communications scheme. In some cases, the NPBCH communications scheme may be a non-beamformed communications scheme, and a first carrier may carry NPBCH communications.

The capability indication component 1515 may receive, responsive to the NPBCH communication, an indication 1550 from a UE that indicates a UE capability to support beamformed communications for narrowband downlink communications from the base station. In some cases, capability indication component 1515 may provide beamforming capability information 1551 associated with the capability to a beamforming configuration manager 1520.

The beamforming configuration manager 1520 may determine, based on the beamforming capability information 1551, a beamformed narrowband communications scheme for one or more of narrowband downlink shared channel communications or narrowband downlink control channel communications to the UE. In some examples, the beamforming configuration manager 1520 may transmit, to the UE, configuration information 1555 indicating the beamformed narrowband communications scheme, where the one or more beamformed narrowband downlink shared channel communications or narrowband downlink control channel communications may be configured on a different carrier than the NPBCH. In some examples, the beamforming configuration manager 1520 may determine beamforming parameters for the one or more beamformed narrowband downlink shared channel communications or narrowband downlink control channel communications to the UE based on a measurement report. In some examples, beamforming configuration manager 1520 may provide an indication 1560 of the beamformed narrowband communications scheme to a transmission beam manager 1525.

In some examples, the beamforming configuration manager 1520 may determine a reference signal pattern based on the indication of MU-MIMO or SU-MIMO. In some examples, the beamforming configuration manager 1520 may transmit a second configuration 1555 to the UE indicating the narrowband downlink control channel is on the first carrier, and where the beamformed narrowband communications scheme is used only for the narrowband downlink shared channel communications. In some examples, the beamforming configuration manager 1520 may configure an uplink ACK/NACK resource for providing the indication of which of the set of precoded reference signals is preferred. In some examples, the beamforming configuration manager 1520 may provide the uplink ACK/NACK resource to the UE with the configuration information, and where the indication of which of the set of precoded reference signals is preferred at the UE may be received via the uplink ACK/NACK resource.

In some cases, the beamformed narrowband communications scheme may be based on a precoded NRS, and the NPBCH communications scheme uses a non-precoded NRS. In some cases, the configuration information 1555 includes a default precoding cycling granularity for the precoded NRS that indicates a number of subframes between precoding changes for the precoded NRS. In some cases, the precoded NRS may be transmitted via a single antenna port. In some cases, the one or more beamformed narrowband downlink shared channel communications or narrowband downlink control channel communications include data that may be coded based on SFBC or per-RE level co-phase cycling. In some cases, the precoded NRS transmission of a single antenna port or two antenna ports may be independently configured for the narrowband downlink control channel and the narrowband downlink shared channel.

The transmission beam manager 1525 may communicate (e.g., via signals 1565) with the UE based on the beamformed narrowband communications scheme.

The reference signal manager 1530 may transmit one or more precoded NRSs 1570 based on at least in part on the default precoding cycling granularity, and where cross-subframe channel estimation may be restricted. In some examples, the reference signal manager 1530 may receive a measurement report 1575 from the UE based on the one or more precoded reference signal transmissions. In some examples, the reference signal manager 1530 may transmit a trigger 1580 to the UE to perform an aperiodic SRS transmission. In some examples, the reference signal manager 1530 may receive an SRS 1585 from the UE responsive to the trigger.

The DCI component 1535 may transmit DCI 1590 that indicates a change of precoding cycling granularity for a scheduled narrowband downlink shared channel, and where a change of precoding matrix for a subframe may be based on one or more of a subframe number, the default precoding cycling granularity, a configured number of precoders or beams, or a total number of transmission subframes scheduled for the narrowband downlink shared channel. In some cases, the change of precoding cycling granularity indicates that a non-precoded NRS may be used for the scheduled narrowband downlink shared channel.

The CSI feedback component 1540 may transmit a trigger 1595 to the UE to perform an aperiodic CSI measurement. In some examples, the CSI feedback component 1540 may receive a CSI measurement report 1597 from the UE responsive to the trigger. In some examples, the CSI feedback component 1540 may transmit one of: a set of precoded NRSs 1599 or a set of precoded aperiodic CSI reference signals 1599. In some examples, the CSI feedback component 1540 may transmit the trigger 1595 in a downlink grant and receive an indication 1593 of which of the set of precoded reference signals is preferred at the UE.

FIG. 16 shows a diagram of a system 1600 including a device 1605 that supports UE specific beamforming for narrowband communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, via a first carrier, an NPBCH) communication according to an NPBCH communications scheme, receive, responsive to the NPBCH communication, an indication from a UE that indicates a UE capability to support beamformed communications for narrowband downlink communications from the base station, determine, based on the indication of the UE capability, a beamformed narrowband communications scheme for one or more of narrowband downlink shared channel communications or narrowband downlink control channel communications to the UE, transmit, to the UE, configuration information indicating the beamformed narrowband communications scheme, where the one or more beamformed narrowband downlink shared channel communications or narrowband downlink control channel communications may be configured on a different carrier than the NPBCH, and communicate with the UE based on the beamformed narrowband communications scheme.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device to perform various functions (e.g., functions or tasks supporting UE specific beamforming for narrowband communications).

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
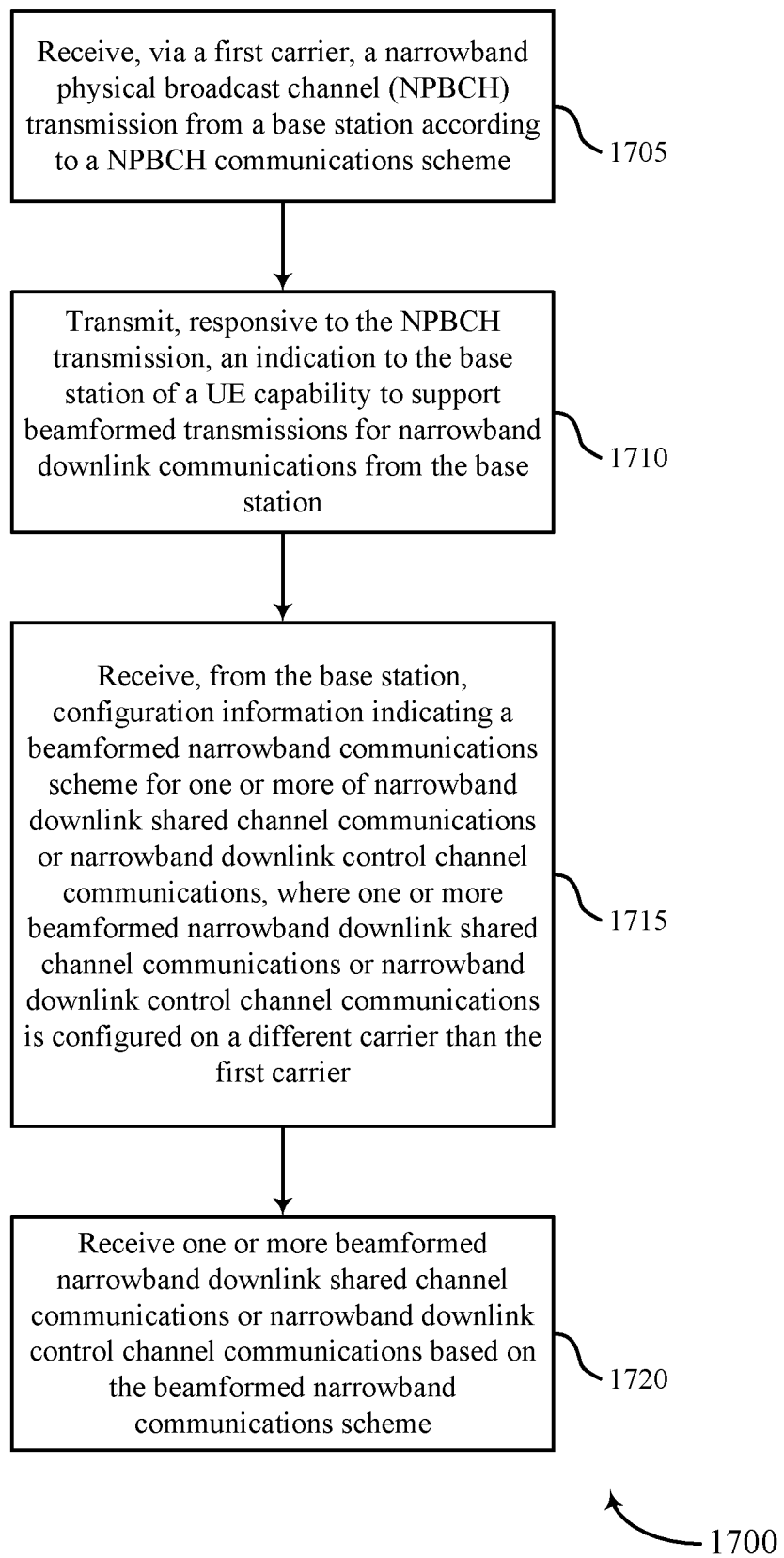

FIG. 17 shows a flowchart illustrating a method 1700 that supports UE specific beamforming for narrowband communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive, via a first carrier, an NPBCH transmission from a base station according to an NPBCH communications scheme. The operations of 1705 may be performed according to the methods described herein. In some examples, aspects of the operations of 1705 may be performed by a connection establishment manager as described with reference to FIGS. 9 through 12. In some cases, the NPBCH communications scheme may be a non-beamformed communications scheme, and a first carrier may carry NPBCH communications.

At 1710, the UE may transmit, responsive to the NPBCH transmission, an indication to the base station of a UE capability to support beamformed transmissions for narrowband downlink communications from the base station. The operations of 1710 may be performed according to the methods described herein. In some examples, aspects of the operations of 1710 may be performed by a capability indication component as described with reference to FIGS. 9 through 12. In some cases, the UE may transmit an explicit indication of capability (e.g., in an IE within a capability indication message) to the base station. In other cases, the UE capability may be inferred from a UE category or UE class that may be transmitted to the base station. In some cases, the UE capability indication may be provided in RRC signaling during a connection establishment, connection reestablishment, or connection reconfiguration.

At 1715, the UE may receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications is configured on a different carrier than the first carrier. The operations of 1715 may be performed according to the methods described herein. In some examples, aspects of the operations of 1715 may be performed by a beamforming configuration manager as described with reference to FIGS. 9 through 12. In some cases, the beamformed narrowband communications scheme is based on a precoded NRS, and the NPBCH communications scheme is based on a non-precoded NRS. In some cases, the configuration information includes a default precoding cycling granularity for the precoded NRS that indicates a number of subframes between precoding changes for the precoded NRS.

At 1720, the UE may receive one or more beamformed narrowband downlink shared channel communications or narrowband downlink control channel communications based on the beamformed narrowband communications scheme. The operations of 1720 may be performed according to the methods described herein. In some examples, aspects of the operations of 1720 may be performed by a receive beam manager as described with reference to FIGS. 9 through 12. In some cases, the one or more beamformed narrowband downlink shared channel communications or narrowband downlink control channel communications may include beamformed communications via a second carrier that is different than the first carrier of the NPBCH transmission.

Figure 18:
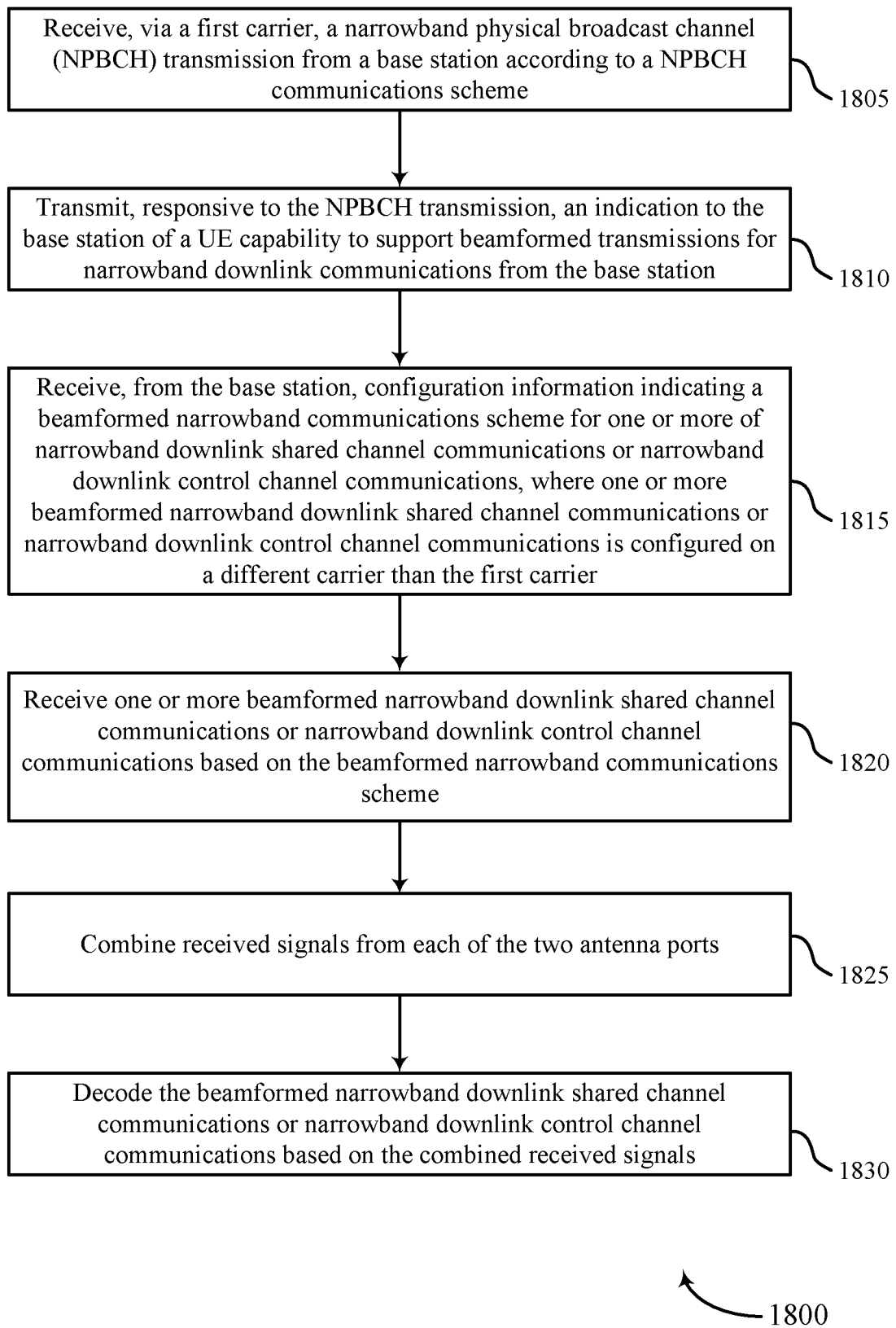

FIG. 18 shows a flowchart illustrating a method 1800 that supports UE specific beamforming for narrowband communications in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive, via a first carrier, an NPBCH transmission from a base station according to an NPBCH communications scheme. The operations of 1805 may be performed according to the methods described herein. In some examples, aspects of the operations of 1805 may be performed by a connection establishment manager as described with reference to FIGS. 9 through 12. In some cases, the NPBCH communications scheme may be a non-beamformed communications scheme, and a first carrier may carry NPBCH communications.

At 1810, the UE may transmit, responsive to the NPBCH transmission, an indication to the base station of a UE capability to support beamformed transmissions for narrowband downlink communications from the base station. The operations of 1810 may be performed according to the methods described herein. In some examples, aspects of the operations of 1810 may be performed by a capability indication component as described with reference to FIGS. 9 through 12. In some cases, the UE may transmit an explicit indication of capability (e.g., in an IE within a capability indication message) to the base station. In other cases, the UE capability may be inferred from a UE category or UE class that may be transmitted to the base station. In some cases, the UE capability indication may be provided in RRC signaling during a connection establishment, connection reestablishment, or connection reconfiguration.

At 1815, the UE may receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications is configured on a different carrier than the first carrier. The operations of 1815 may be performed according to the methods described herein. In some examples, aspects of the operations of 1815 may be performed by a beamforming configuration manager as described with reference to FIGS. 9 through 12. In some cases, the beamformed narrowband communications scheme may be based on a precoded NRS, and the NPBCH communications scheme uses a non-precoded NRS. In some cases, the configuration information includes a default precoding cycling granularity for the precoded NRS that indicates a number of subframes between precoding changes for the precoded NRS.

At 1820, the UE may receive one or more beamformed narrowband downlink shared channel communications or narrowband downlink control channel communications based on the beamformed narrowband communications scheme. The operations of 1820 may be performed according to the methods described herein. In some examples, aspects of the operations of 1820 may be performed by a receive beam manager as described with reference to FIGS. 9 through 12. In some cases, the one or more beamformed narrowband downlink shared channel communications or narrowband downlink control channel communications may include beamformed communications via a second carrier that is different than the first carrier of the NPBCH transmission.

At 1825, the UE may combine received signals from each of the two antenna ports. The operations of 1825 may be performed according to the methods described herein. In some examples, aspects of the operations of 1825 may be performed by a decoder as described with reference to FIGS. 9 through 12.

At 1830, the UE may decode the beamformed narrowband downlink shared channel communications or narrowband downlink control channel communications based on the combined received signals. The operations of 1830 may be performed according to the methods described herein. In some examples, aspects of the operations of 1830 may be performed by a decoder as described with reference to FIGS. 9 through 12. In some cases, the decoding may be based on SFBC or per-RE level co-phase cycling.

Figure 19:
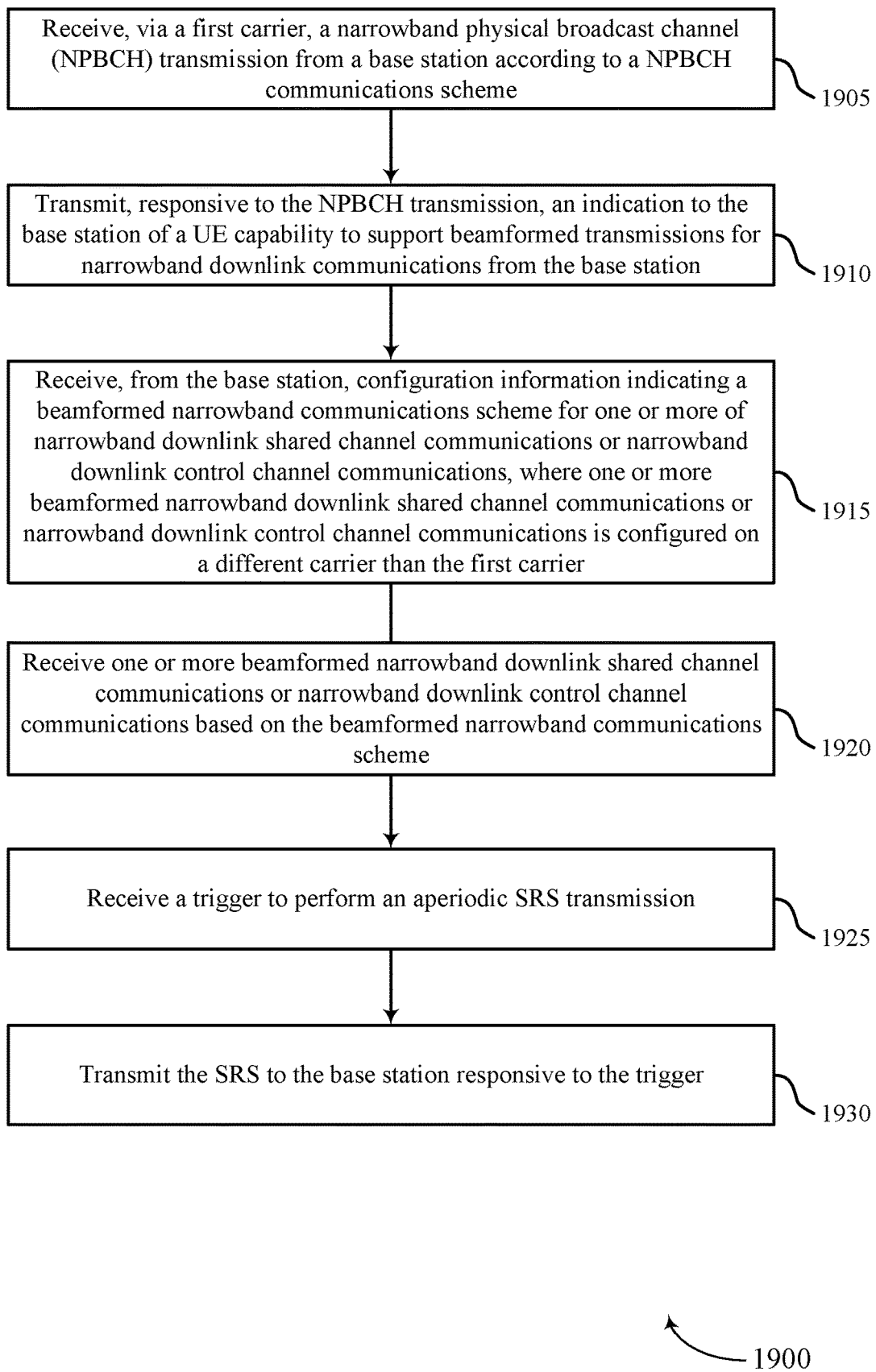

FIG. 19 shows a flowchart illustrating a method 1900 that supports UE specific beamforming for narrowband communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive, via a first carrier, an NPBCH transmission from a base station according to an NPBCH communications scheme. The operations of 1905 may be performed according to the methods described herein. In some examples, aspects of the operations of 1905 may be performed by a connection establishment manager as described with reference to FIGS. 9 through 12. In some cases, the NPBCH communications scheme may be a non-beamformed communications scheme, and a first carrier may carry NPBCH communications.

At 1910, the UE may transmit, responsive to the NPBCH transmission, an indication to the base station of a UE capability to support beamformed transmissions for narrowband downlink communications from the base station. The operations of 1910 may be performed according to the methods described herein. In some examples, aspects of the operations of 1910 may be performed by a capability indication component as described with reference to FIGS. 9 through 12. In some cases, the UE may transmit an explicit indication of capability (e.g., in an IE within a capability indication message) to the base station. In other cases, the UE capability may be inferred from a UE category or UE class that may be transmitted to the base station. In some cases, the UE capability indication may be provided in RRC signaling during a connection establishment, connection reestablishment, or connection reconfiguration.

At 1915, the UE may receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier. The operations of 1915 may be performed according to the methods described herein. In some examples, aspects of the operations of 1915 may be performed by a beamforming configuration manager as described with reference to FIGS. 9 through 12. In some cases, the beamformed narrowband communications scheme may be based on a precoded NRS, and the NPBCH communications scheme uses a non-precoded NRS. In some cases, the configuration information includes a default precoding cycling granularity for the precoded NRS that indicates a number of subframes between precoding changes for the precoded NRS.

At 1920, the UE may receive one or more beamformed narrowband downlink shared channel communications or narrowband downlink control channel communications based on the beamformed narrowband communications scheme. The operations of 1920 may be performed according to the methods described herein. In some examples, aspects of the operations of 1920 may be performed by a receive beam manager as described with reference to FIGS. 9 through 12. In some cases, the one or more beamformed narrowband downlink shared channel communications or narrowband downlink control channel communications may include beamformed communications via a second carrier that is different than the first carrier of the NPBCH transmission.

At 1925, the UE may receive a trigger to perform an aperiodic SRS transmission. The operations of 1925 may be performed according to the methods described herein. In some examples, aspects of the operations of 1925 may be performed by a reference signal manager as described with reference to FIGS. 9 through 12.

At 1930, the UE may transmit the SRS to the base station responsive to the trigger. The operations of 1930 may be performed according to the methods described herein. In some examples, aspects of the operations of 1930 may be performed by a reference signal manager as described with reference to FIGS. 9 through 12.

Figure 20:
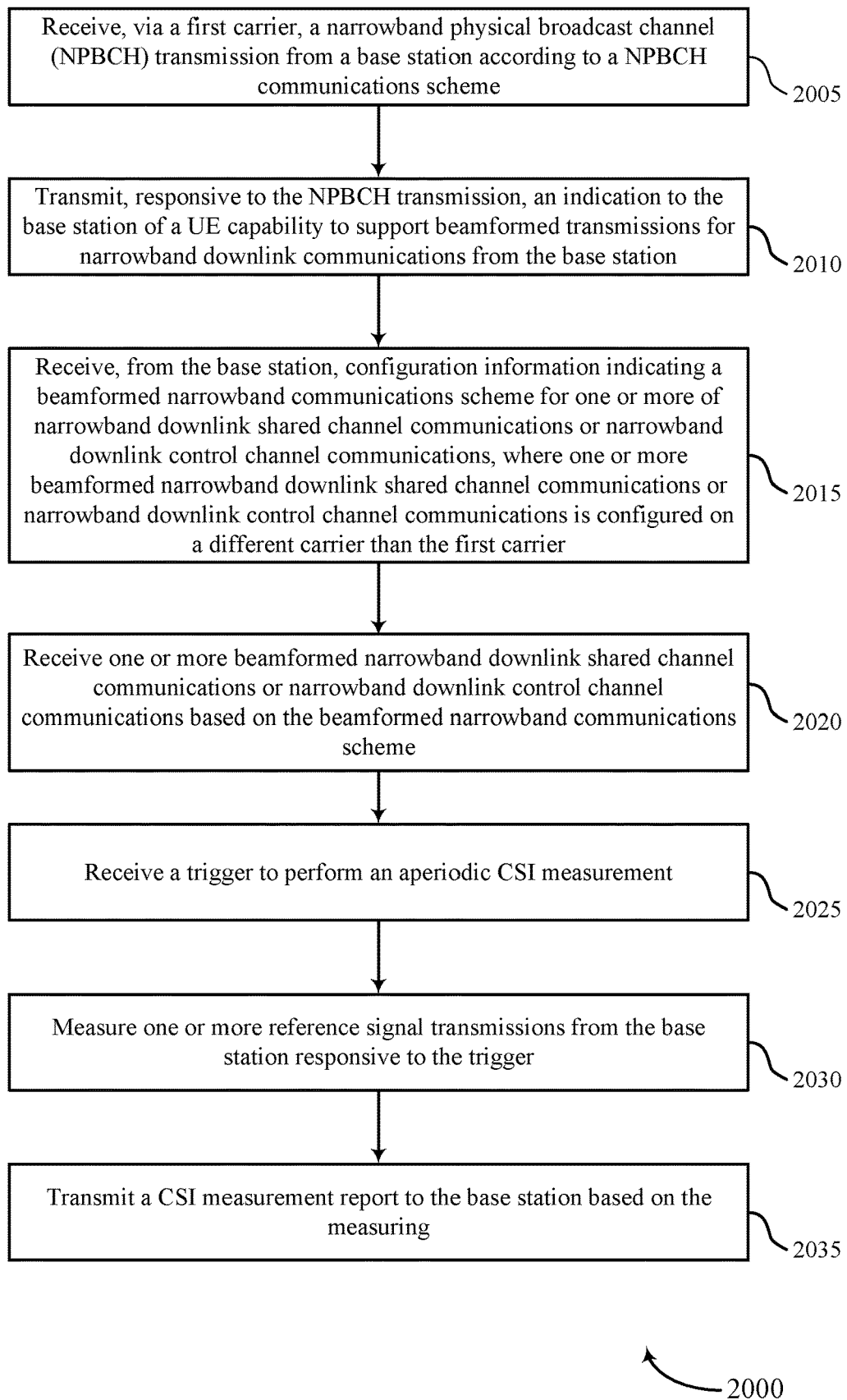

FIG. 20 shows a flowchart illustrating a method 2000 that supports UE specific beamforming for narrowband communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, via a first carrier, an NPBCH transmission from a base station according to an NPBCH communications scheme. The operations of 2005 may be performed according to the methods described herein. In some examples, aspects of the operations of 2005 may be performed by a connection establishment manager as described with reference to FIGS. 9 through 12. In some cases, the NPBCH communications scheme may be a non-beamformed communications scheme, and a first carrier may carry NPBCH communications.

At 2010, the UE may transmit, responsive to the NPBCH transmission, an indication to the base station of a UE capability to support beamformed transmissions for narrowband downlink communications from the base station. The operations of 2010 may be performed according to the methods described herein. In some examples, aspects of the operations of 2010 may be performed by a capability indication component as described with reference to FIGS. 9 through 12. In some cases, the UE may transmit an explicit indication of capability (e.g., in an IE within a capability indication message) to the base station. In other cases, the UE capability may be inferred from a UE category or UE class that may be transmitted to the base station. In some cases, the UE capability indication may be provided in RRC signaling during a connection establishment, connection reestablishment, or connection reconfiguration.

At 2015, the UE may receive, from the base station, configuration information indicating a beamformed narrowband communications scheme for one or more of narrowband downlink shared channel communications or narrowband downlink control channel communications, where the one or more beamformed narrowband downlink shared channel communications or narrowband downlink control channel communications may be configured on a different carrier than the first carrier. The operations of 2015 may be performed according to the methods described herein. In some examples, aspects of the operations of 2015 may be performed by a beamforming configuration manager as described with reference to FIGS. 9 through 12. In some cases, the beamformed narrowband communications scheme may be based on a precoded NRS, and the NPBCH communications scheme uses a non-precoded NRS. In some cases, the configuration information includes a default precoding cycling granularity for the precoded NRS that indicates a number of subframes between precoding changes for the precoded NRS.

At 2020, the UE may receive one or more beamformed narrowband downlink shared channel communications or narrowband downlink control channel communications based on the beamformed narrowband communications scheme. The operations of 2020 may be performed according to the methods described herein. In some examples, aspects of the operations of 2020 may be performed by a receive beam manager as described with reference to FIGS. 9 through 12. In some cases, the one or more beamformed narrowband downlink shared channel communications or narrowband downlink control channel communications may include beamformed communications via a second carrier that is different than the first carrier of the NPBCH transmission.

At 2025, the UE may receive a trigger to perform an aperiodic CSI measurement. The operations of 2025 may be performed according to the methods described herein. In some examples, aspects of the operations of 2025 may be performed by a CSI feedback component as described with reference to FIGS. 9 through 12.

At 2030, the UE may measure one or more reference signal transmissions from the base station responsive to the trigger. The operations of 2030 may be performed according to the methods described herein. In some examples, aspects of the operations of 2030 may be performed by a CSI feedback component as described with reference to FIGS. 9 through 12.

At 2035, the UE may transmit a CSI measurement report to the base station based on the measuring. The operations of 2035 may be performed according to the methods described herein. In some examples, aspects of the operations of 2035 may be performed by a CSI feedback component as described with reference to FIGS. 9 through 12.

Figure 21:
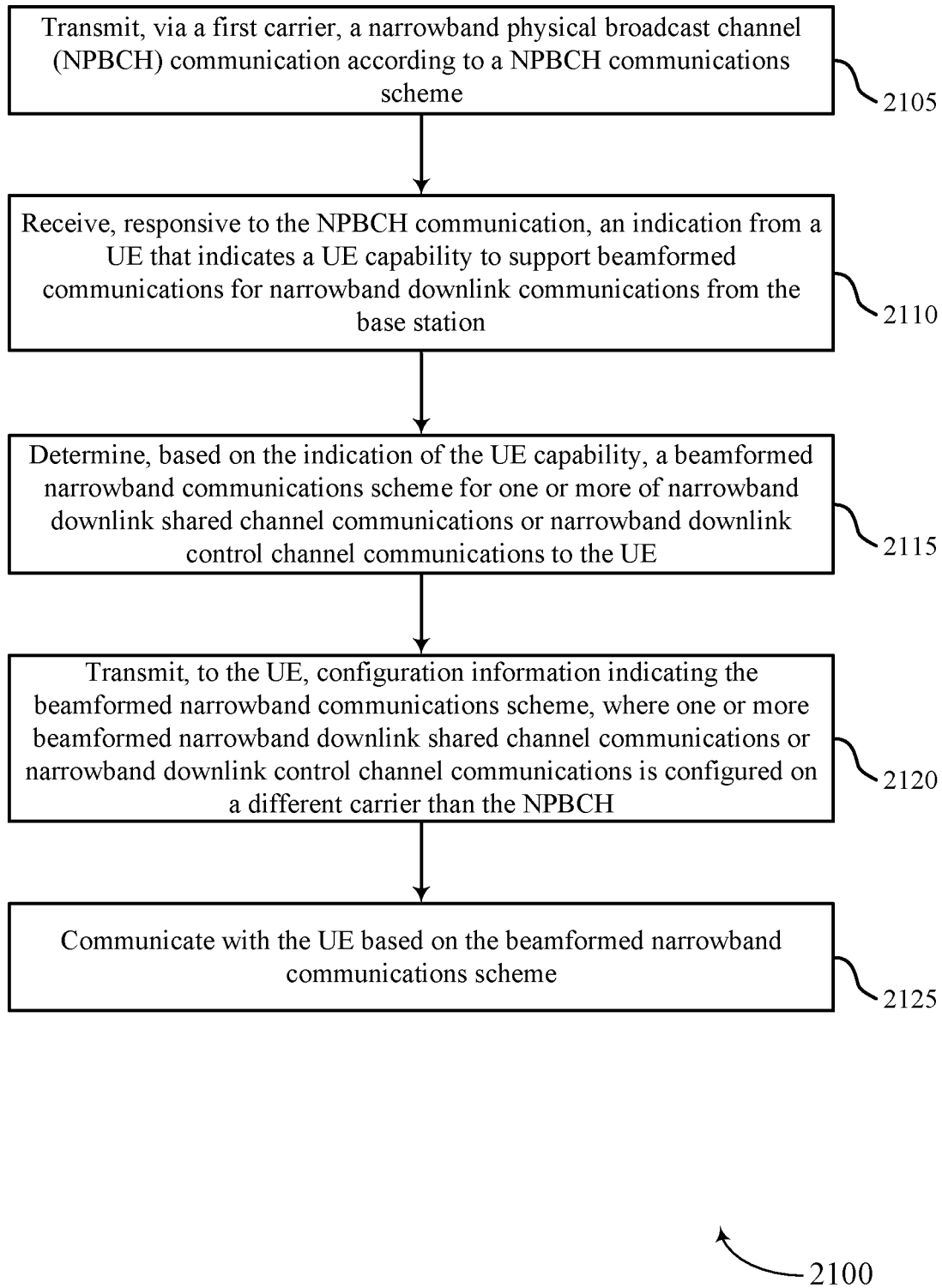

FIG. 21 shows a flowchart illustrating a method 2100 that supports UE specific beamforming for narrowband communications in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, via a first carrier, an NPBCH communication according to an NPBCH communications scheme. The operations of 2105 may be performed according to the methods described herein. In some examples, aspects of the operations of 2105 may be performed by a connection establishment manager as described with reference to FIGS. 13 through 16. In some cases, the NPBCH communications scheme may be a non-beamformed communications scheme, and a first carrier may carry NPBCH communications.

At 2110, the base station may receive, responsive to the NPBCH communication, an indication from a UE that indicates a UE capability to support beamformed communications for narrowband downlink communications from the base station. The operations of 2110 may be performed according to the methods described herein. In some examples, aspects of the operations of 2110 may be performed by a capability indication component as described with reference to FIGS. 13 through 16. In some cases, UEs may transmit an explicit indication of capability (e.g., in an IE within a capability indication message) to the base station. In other cases, the UE capability may be inferred from a UE category or UE class that may be transmitted to the base station.

At 2115, the base station may determine, based on the indication of the UE capability, a beamformed narrowband communications scheme for one or more of narrowband downlink shared channel communications or narrowband downlink control channel communications to the UE. The operations of 2115 may be performed according to the methods described herein. In some examples, aspects of the operations of 2115 may be performed by a beamforming configuration manager as described with reference to FIGS. 13 through 16. In some cases, the beamformed narrowband communications scheme may be based on a precoded NRS, and the NPBCH communications scheme uses a non-precoded NRS. In some cases, the configuration information includes a default precoding cycling granularity for the precoded NRS that indicates a number of subframes between precoding changes for the precoded NRS.

At 2120, the base station may transmit, to the UE, configuration information indicating the beamformed narrowband communications scheme, where the one or more beamformed narrowband downlink shared channel communications or narrowband downlink control channel communications may be configured on a different carrier than the NPBCH. The operations of 2120 may be performed according to the methods described herein. In some examples, aspects of the operations of 2120 may be performed by a beamforming configuration manager as described with reference to FIGS. 13 through 16.

At 2125, the base station may communicate with the UE based on the beamformed narrowband communications scheme. The operations of 2125 may be performed according to the methods described herein. In some examples, aspects of the operations of 2125 may be performed by a transmission beam manager as described with reference to FIGS. 13 through 16.

Figure 22:
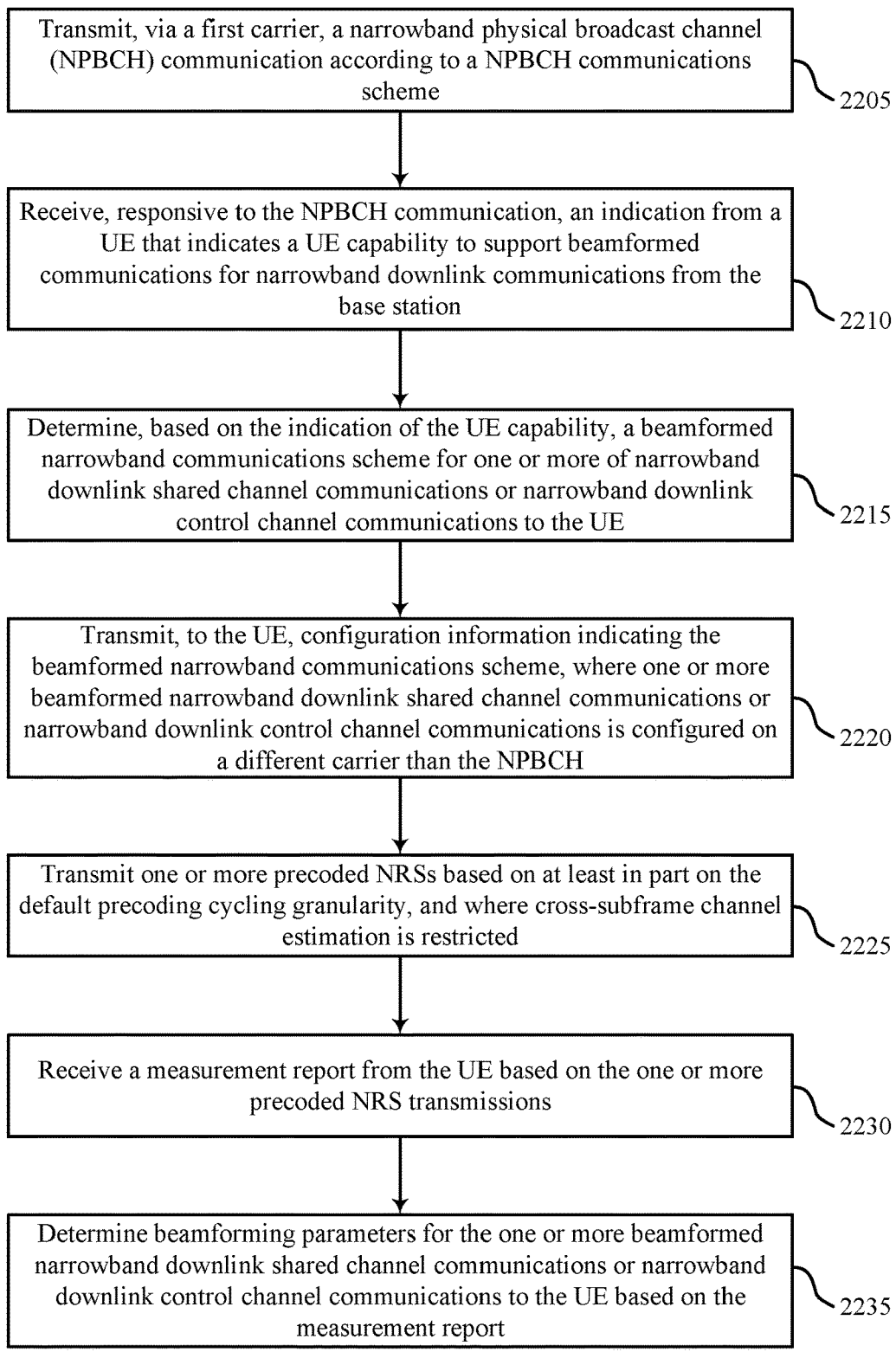

FIG. 22 shows a flowchart illustrating a method 2200 that supports UE specific beamforming for narrowband communications in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit, via a first carrier, an NPBCH communication according to an NPBCH communications scheme. The operations of 2205 may be performed according to the methods described herein. In some examples, aspects of the operations of 2205 may be performed by a connection establishment manager as described with reference to FIGS. 13 through 16. In some cases, the NPBCH communications scheme may be a non-beamformed communications scheme, and a first carrier may carry NPBCH communications.

At 2210, the base station may receive, responsive to the NPBCH communication, an indication from a UE that indicates a UE capability to support beamformed communications for narrowband downlink communications from the base station. The operations of 2210 may be performed according to the methods described herein. In some examples, aspects of the operations of 2210 may be performed by a capability indication component as described with reference to FIGS. 13 through 16. In some cases, UEs may transmit an explicit indication of capability (e.g., in an IE within a capability indication message) to the base station. In other cases, the UE capability may be inferred from a UE category or UE class that may be transmitted to the base station.

At 2215, the base station may determine, based on the indication of the UE capability, a beamformed narrowband communications scheme for one or more of narrowband downlink shared channel communications or narrowband downlink control channel communications to the UE. The operations of 2215 may be performed according to the methods described herein. In some examples, aspects of the operations of 2215 may be performed by a beamforming configuration manager as described with reference to FIGS. 13 through 16.

At 2220, the base station may transmit, to the UE, configuration information indicating the beamformed narrowband communications scheme, where the one or more beamformed narrowband downlink shared channel communications or narrowband downlink control channel communications may be configured on a different carrier than the NPBCH. The operations of 2220 may be performed according to the methods described herein. In some examples, aspects of the operations of 2220 may be performed by a beamforming configuration manager as described with reference to FIGS. 13 through 16. In some cases, the beamformed narrowband communications scheme may be based on a precoded NRS), and the NPBCH communications scheme uses a non-precoded NRS, and where the configuration information includes a default precoding cycling granularity for the precoded NRS that indicates a number of subframes between precoding changes for the precoded NRS. In some cases, the configuration information includes a default precoding cycling granularity for the precoded NRS that indicates a number of subframes between precoding changes for the precoded NRS.

At 2225, the base station may transmit one or more precoded NRSs based on at least in part on the default precoding cycling granularity, and where cross-subframe channel estimation may be restricted. The operations of 2225 may be performed according to the methods described herein. In some examples, aspects of the operations of 2225 may be performed by a reference signal manager as described with reference to FIGS. 13 through 16.

At 2230, the base station may receive a measurement report from the UE based on the one more precoded NRS transmissions. The operations of 2230 may be performed according to the methods described herein. In some examples, aspects of the operations of 2230 may be performed by a reference signal manager as described with reference to FIGS. 13 through 16.

At 2235, the base station may determine beamforming parameters for the one or more beamformed narrowband downlink shared channel communications or narrowband downlink control channel communications to the UE based on the measurement report. The operations of 2235 may be performed according to the methods described herein. In some examples, aspects of the operations of 2235 may be performed by a beamforming configuration manager as described with reference to FIGS. 13 through 16.

Figure 23:
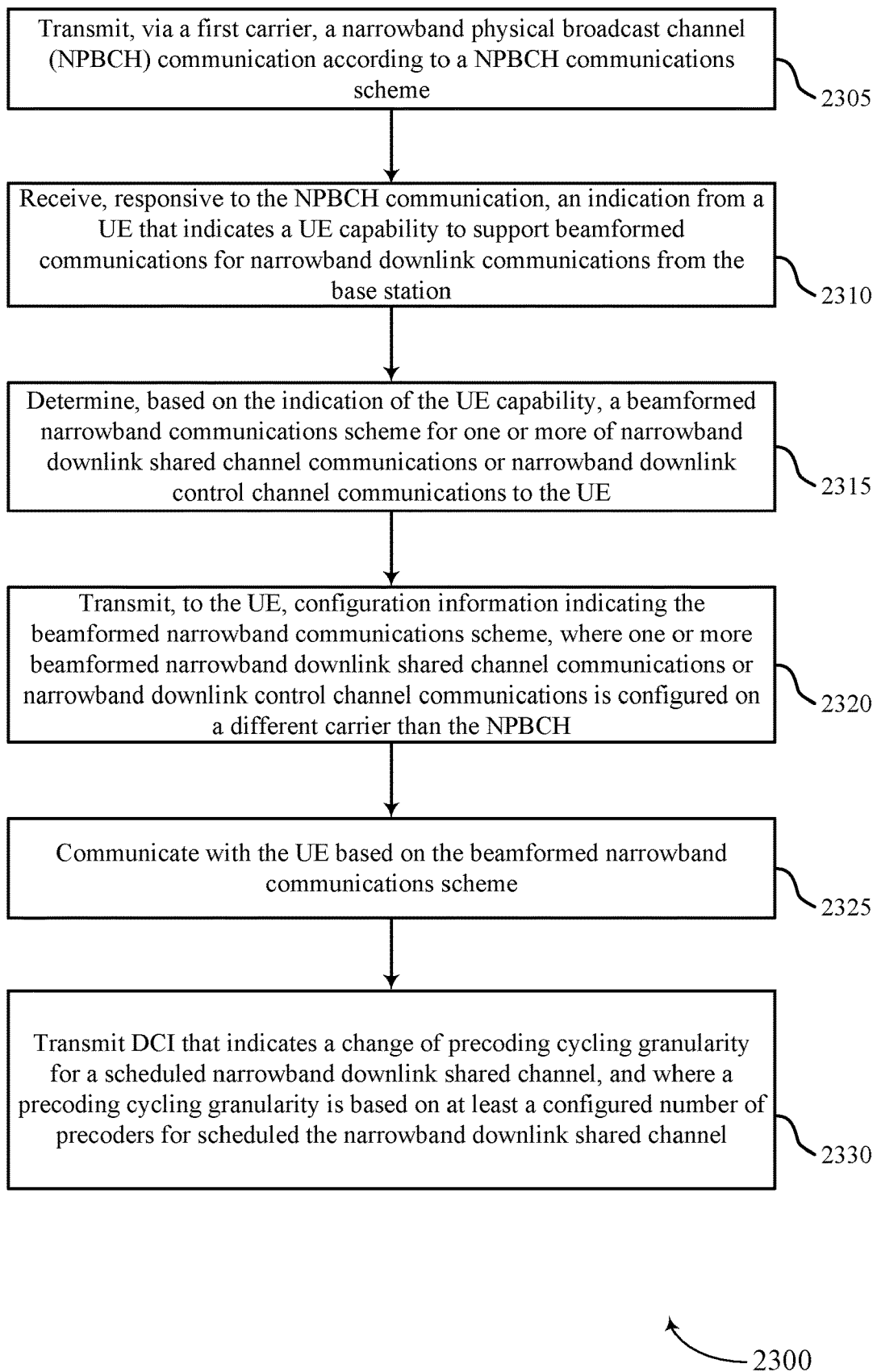

FIG. 23 shows a flowchart illustrating a method 2300 that supports UE specific beamforming for narrowband communications in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may transmit, via a first carrier, an NPBCH communication according to an NPBCH communications scheme. The operations of 2305 may be performed according to the methods described herein. In some examples, aspects of the operations of 2305 may be performed by a connection establishment manager as described with reference to FIGS. 13 through 16. In some cases, the NPBCH communications scheme may be a non-beamformed communications scheme, and a first carrier may carry NPBCH communications.

At 2310, the base station may receive, responsive to the NPBCH communication, an indication from a UE that indicates a UE capability to support beamformed communications for narrowband downlink communications from the base station. The operations of 2310 may be performed according to the methods described herein. In some examples, aspects of the operations of 2310 may be performed by a capability indication component as described with reference to FIGS. 13 through 16. In some cases, UEs may transmit an explicit indication of capability (e.g., in an IE within a capability indication message) to the base station. In other cases, the UE capability may be inferred from a UE category or UE class that may be transmitted to the base station.

At 2315, the base station may determine, based on the indication of the UE capability, a beamformed narrowband communications scheme for one or more of narrowband downlink shared channel communications or narrowband downlink control channel communications to the UE. The operations of 2315 may be performed according to the methods described herein. In some examples, aspects of the operations of 2315 may be performed by a beamforming configuration manager as described with reference to FIGS. 13 through 16.

At 2320, the base station may transmit, to the UE, configuration information indicating the beamformed narrowband communications scheme, where the one or more beamformed narrowband downlink shared channel communications or narrowband downlink control channel communications may be configured on a different carrier than the NPBCH. The operations of 2320 may be performed according to the methods described herein. In some examples, aspects of the operations of 2320 may be performed by a beamforming configuration manager as described with reference to FIGS. 13 through 16.

At 2325, the base station may communicate with the UE based on the beamformed narrowband communications scheme. The operations of 2325 may be performed according to the methods described herein. In some examples, aspects of the operations of 2325 may be performed by a transmission beam manager as described with reference to FIGS. 13 through 16. In some cases, the beamformed narrowband communications scheme may be based on a precoded NRS), and the NPBCH communications scheme uses a non-precoded NRS, and where the configuration information includes a default precoding cycling granularity for the precoded NRS that indicates a number of subframes between precoding changes for the precoded NRS. In some cases, the configuration information includes a default precoding cycling granularity for the precoded NRS that indicates a number of subframes between precoding changes for the precoded NRS.

At 2330, the base station may transmit DCI that indicates a change of precoding cycling granularity for a scheduled narrowband downlink shared channel, and where a precoding matrix for a subframe may be based on one or more of a subframe number, the default precoding cycling granularity, a configured number of precoders or beams, or a total number of transmission subframes scheduled for the narrowband downlink shared channel. The operations of 2343 may be performed according to the methods described herein. In some examples, aspects of the operations of 2330 may be performed by a DCI component as described with reference to FIGS. 13 through 16.

Figure 24:
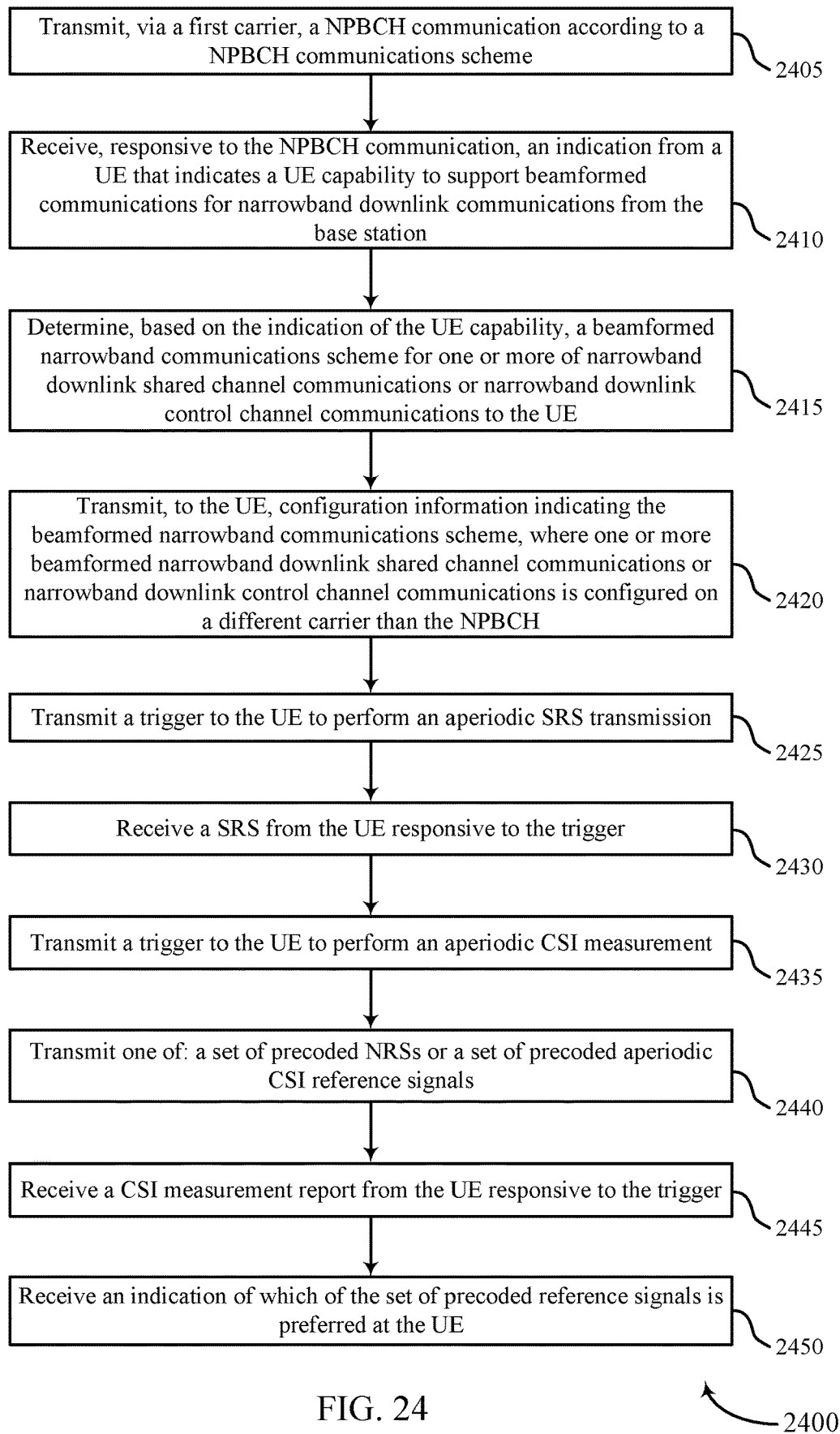

FIG. 24 shows a flowchart illustrating a method 2400 that supports UE specific beamforming for narrowband communications in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may transmit, via a first carrier, an NPBCH communication according to an NPBCH communications scheme. The operations of 2405 may be performed according to the methods described herein. In some examples, aspects of the operations of 2405 may be performed by a connection establishment manager as described with reference to FIGS. 13 through 16. In some cases, the NPBCH communications scheme may be a non-beamformed communications scheme, and a first carrier may carry NPBCH communications.

At 2410, the base station may receive, responsive to the NPBCH communication, an indication from a UE that indicates a UE capability to support beamformed communications for narrowband downlink communications from the base station. The operations of 2410 may be performed according to the methods described herein. In some examples, aspects of the operations of 2410 may be performed by a capability indication component as described with reference to FIGS. 13 through 16. In some cases, UEs may transmit an explicit indication of capability (e.g., in an IE within a capability indication message) to the base station. In other cases, the UE capability may be inferred from a UE category or UE class that may be transmitted to the base station.

At 2415, the base station may determine, based on the indication of the UE capability, a beamformed narrowband communications scheme for one or more of narrowband downlink shared channel communications or narrowband downlink control channel communications to the UE. The operations of 2415 may be performed according to the methods described herein. In some examples, aspects of the operations of 2415 may be performed by a beamforming configuration manager as described with reference to FIGS. 13 through 16.

At 2420, the base station may transmit, to the UE, configuration information indicating the beamformed narrowband communications scheme, where the one or more beamformed narrowband downlink shared channel communications or narrowband downlink control channel communications may be configured on a different carrier than the NPBCH. The operations of 2420 may be performed according to the methods described herein. In some examples, aspects of the operations of 2420 may be performed by a beamforming configuration manager as described with reference to FIGS. 13 through 16.

At 2425, the base station may transmit a trigger to the UE to perform an aperiodic SRS transmission. The operations of 2425 may be performed according to the methods described herein. In some examples, aspects of the operations of 2425 may be performed by a reference signal manager as described with reference to FIGS. 13 through 16.

At 2430, the base station may receive an SRS from the UE responsive to the trigger. The operations of 2430 may be performed according to the methods described herein. In some examples, aspects of the operations of 2430 may be performed by a reference signal manager as described with reference to FIGS. 13 through 16.

At 2435, the base station may transmit a trigger to the UE to perform an aperiodic CSI measurement. The operations of 2435 may be performed according to the methods described herein. In some examples, aspects of the operations of 2435 may be performed by a CSI feedback component as described with reference to FIGS. 13 through 16.

At 2440, the base station may transmit one of: a set of precoded NRSs or a set of precoded aperiodic CSI reference signals. The operations of 2440 may be performed according to the methods described herein. In some examples, aspects of the operations of 2440 may be performed by a CSI feedback component as described with reference to FIGS. 13 through 16.

At 2445, the base station may receive a CSI measurement report from the UE responsive to the trigger. The operations of 2445 may be performed according to the methods described herein. In some examples, aspects of the operations of 2445 may be performed by a CSI feedback component as described with reference to FIGS. 13 through 16.

At 2450, the base station may transmit the trigger in a downlink grant and receive an indication of which of the set of precoded reference signals is preferred at the UE. The operations of 2450 may be performed according to the methods described herein. In some examples, aspects of the operations of 2450 may be performed by a CSI feedback component as described with reference to FIGS. 13 through 16. In some cases, the base station may configure an uplink ACK/NACK resource for providing the indication of which of the set of precoded reference signals is preferred. In such cases, the base station may provide the uplink ACK/NACK resource to the UE with the configuration information, and where the indication of which of the set of precoded reference signals is preferred at the UE is received via the uplink ACK/NACK resource.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. Therefore, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, at the UE via a first carrier, a non-beamformed narrowband physical broadcast channel (NPBCH) transmission according to an NPBCH communications scheme;
transmitting, responsive to the non-beamformed NPBCH transmission, an indication of a capability of the UE to support a beamformed narrowband communications scheme for narrowband downlink communications, wherein the beamformed narrowband communications scheme provides precoded transmissions and is different than the NPBCH communications scheme that provides non-precoded NPBCH transmissions;
receiving, at the UE, configuration information indicating the beamformed narrowband communications scheme for one or more beamformed narrowband downlink shared channel communications or beamformed narrowband downlink control channel communications, wherein the one or more beamformed narrowband downlink shared channel communications or beamformed narrowband downlink control channel communications is configured on a different carrier than the first carrier; and
receiving, at the UE, the one or more beamformed narrowband downlink shared channel communications or beamformed narrowband downlink control channel communications based at least in part on the beamformed narrowband communications scheme.

2. The method of claim 1, wherein the beamformed narrowband communications scheme is based on a precoded narrowband reference signal (NRS), and the NPBCH communications scheme uses a non-precoded NRS.

3. The method of claim 2, wherein the configuration information includes a default precoding cycling granularity for the precoded NRS that indicates a number of subframes between precoding changes for the precoded NRS.

4. The method of claim 3, further comprising:
measuring one or more precoded NRS transmissions based at least in part on the default precoding cycling granularity, and wherein cross-subframe channel estimation is restricted.

5. The method of claim 4, wherein the one or more precoded NRS transmissions are received via two antenna ports, and wherein the receiving comprises:
combining received signals from each of the two antenna ports; and
decoding the beamformed narrowband downlink shared channel communications or beamformed narrowband downlink control channel communications based on the combined received signals.

6. The method of claim 5, wherein the decoding is based at least in part on space frequency block coding (SFBC) or per-resource element (RE) level co-phase cycling.

7. The method of claim 3, further comprising:
receiving downlink control information (DCI) that indicates a change of precoding cycling granularity for a scheduled narrowband downlink shared channel, wherein the change of precoding cycling granularity is based at least in part on a configured number of precoders for the scheduled narrowband downlink shared channel.

8. The method of claim 7, wherein the change of precoding cycling granularity indicates that the non-precoded NRS is used for the scheduled narrowband downlink shared channel.

9. The method of claim 1, wherein the configuration information comprises a first number of antenna ports for the beamformed narrowband communications scheme different than a second number of antenna ports for the NPBCH communications scheme, wherein the one or more beamformed narrowband downlink shared channel communications or beamformed narrowband downlink control channel communications are received via the first number of antenna ports.

10. The method of claim 1, wherein the beamformed narrowband communications scheme is independently configured for the narrowband downlink control channel and the narrowband downlink shared channel.

11. The method of claim 1, wherein the configuration information further indicates whether a multi-user multiple input multiple output (MU-MIMO) or a single-user multiple input multiple output (SU-MIMO) communications scheme is used for downlink communications to the UE, and wherein the method further comprises:
determining a reference signal pattern based at least in part on the indication of MU-MIMO or SU-MIMO.

12. The method of claim 1, further comprising:
receiving second configuration information indicating the narrowband downlink control channel is on the first carrier, and wherein the beamformed narrowband communications scheme is used only for the beamformed narrowband downlink shared channel communications.

13. The method of claim 1, wherein the configuration information includes information for an aperiodic sounding reference signal (SRS), and wherein the method further comprises:
receiving a trigger to perform an aperiodic sounding reference signal (SRS) transmission; and
transmitting the aperiodic SRS responsive to the trigger.

14. The method of claim 1, further comprising:
receiving a trigger to perform an aperiodic channel state information (CSI) measurement;
measuring one or more reference signal transmissions responsive to the trigger; and
transmitting a CSI measurement report based at least in part on the measuring.

15. The method of claim 14, wherein the trigger is received in a downlink grant and the one or more reference signal transmissions include one of: a plurality of precoded NRSs or a plurality of precoded aperiodic CSI reference signals.

16. The method of claim 15, wherein the plurality of precoded reference signals are transmitted using null resource elements of the narrowband downlink shared channel.

17. A method for wireless communication at an access network entity, comprising:
transmitting, via a first carrier, a non-beamformed narrowband physical broadcast channel (NPBCH) communication according to an NPBCH communications scheme, wherein the NPBCH communications scheme provides non-precoded NPBCH transmissions, and wherein a beamformed narrowband communications scheme that provides precoded transmissions is configured independently of the NPBCH communications scheme;
receiving, responsive to the non-beamformed NPBCH communication, an indication from a UE that indicates a capability of the UE to support beamformed communications for narrowband downlink communications from the access network entity;

determining, at the access network entity based at least in part on the indication of the capability of the UE, the beamformed narrowband communications scheme for one or more beamformed narrowband downlink shared channel communications or beamformed narrowband downlink control channel communications to the UE;

transmitting, to the UE, configuration information indicating the beamformed narrowband communications scheme, wherein the one or more beamformed narrowband downlink shared channel communications or beamformed narrowband downlink control channel communications is configured on a different carrier than the first carrier; and communicating with the UE based at least in part on the beamformed narrowband communications scheme.

18. The method of claim 17, wherein the beamformed narrowband communications scheme is based on a precoded narrowband reference signal (NRS), and the NPBCH communications scheme uses a non-precoded NRS, and wherein the configuration information includes a default precoding cycling granularity for the precoded NRS that indicates a number of subframes between precoding changes for the precoded NRS.

19. The method of claim 18, further comprising:
transmitting one or more precoded NRSs based on at least in part on the default precoding cycling granularity, and wherein cross-subframe channel estimation is restricted.

20. The method of claim 17, wherein the configuration information includes information for an aperiodic sounding reference signal (SRS), and wherein the method further comprises:
transmitting a trigger to the UE to perform an aperiodic SRS transmission; and
receiving the aperiodic SRS from the UE responsive to the trigger.

21. The method of claim 19, further comprising:
transmitting downlink control information (DCI) that indicates a change of precoding cycling granularity for a scheduled narrowband downlink shared channel, and wherein the change of precoding cycling granularity is based at least in part on a configured number of precoders for the scheduled narrowband downlink shared channel.

22. The method of claim 21, wherein the change of precoding cycling granularity indicates that the non-precoded NRS is used for the scheduled narrowband downlink shared channel.

23. The method of claim 17, wherein the configuration information comprises a first number of antenna ports for the beamformed narrowband communications scheme different than a second number of antenna ports for the NPBCH communications scheme, wherein the one or more beamformed narrowband downlink shared channel communications or beamformed narrowband downlink control channel communications are received via the first number of antenna ports.

24. The method of claim 17, further comprising:
transmitting a second configuration to the UE indicating the narrowband downlink control channel is on the first carrier, and wherein the beamformed narrowband communications scheme is used only for the beamformed narrowband downlink shared channel communications.

25. The method of claim 17, further comprising:
transmitting a trigger to the UE to perform an aperiodic channel state information (CSI) measurement;
receiving a CSI measurement report from the UE responsive to the trigger; and
determining beamforming parameters for one or more precoded NRSs to the UE based at least in part on the CSI measurement report.

26. The method of claim 25, wherein the trigger is transmitted in a downlink grant, and wherein the method further comprises:
transmitting one of: a plurality of precoded NRSs or a plurality of precoded aperiodic CSI reference signals using null resource elements of the narrowband downlink shared channel.

27. An apparatus for wireless communication at a user equipment (UE), comprising:
a processor,
memory in electronic communication with the processor; and
instructions stored in the memory and executable by the processor to cause the apparatus to:
receive, at the UE via a first carrier, a non-beamformed narrowband physical broadcast channel (NPBCH) transmission according to an NPBCH communications scheme;
transmit, responsive to the non-beamformed NPBCH transmission, an indication of a capability of the UE to support a beamformed narrowband communications scheme for narrowband downlink communications, wherein the beamformed narrowband communications scheme provides precoded transmissions and is different than the NPBCH communications scheme that provides non-precoded NPBCH transmissions;
receive, at the UE, configuration information indicating the beamformed narrowband communications scheme for one or more narrowband downlink shared channel communications or beamformed narrowband downlink control channel communications, wherein one or more beamformed narrowband downlink shared channel communications or beamformed narrowband downlink control channel communications is configured on a different carrier than the first carrier; and
receive, at the UE, one or more beamformed narrowband downlink shared channel communications or beamformed narrowband downlink control channel communications based at least in part on the beamformed narrowband communications scheme.

28. The apparatus of claim 27, wherein the beamformed narrowband communications scheme is based on a precoded narrowband reference signal (NRS), and the NPBCH communications scheme uses a non-precoded NRS.

29. The apparatus of claim 28, wherein the configuration information includes a default precoding cycling granularity for the precoded NRS that indicates a number of subframes between precoding changes for the precoded NRS.

30. An apparatus for wireless communication at an access network entity, comprising:
a processor,
memory in electronic communication with the processor; and
instructions stored in the memory and executable by the processor to cause the apparatus to:
transmit, via a first carrier, a non-beamformed narrowband physical broadcast channel (NPBCH) communication according to an NPBCH communications scheme, wherein the NPBCH communications scheme provides non-precoded NPBCH transmissions, and wherein a beamformed narrowband communications scheme that provides precoded transmissions is configured independently of the NPBCH communications scheme;

receive, responsive to the non-beamformed NPBCH communication, an indication from a UE that indicates a capability of the UE to support beamformed communications for narrowband downlink communications from the access network entity;

determine, based at least in part on the indication of the capability of the UE, the beamformed narrowband communications scheme for one or more beamformed narrowband downlink shared channel communications or beamformed narrowband downlink control channel communications to the UE;

transmit, to the UE, configuration information indicating the beamformed narrowband communications scheme, wherein the one or more beamformed narrowband downlink shared channel communications or beamformed narrowband downlink control channel communications is configured on a different carrier than the first carrier; and communicate with the UE based at least in part on the beamformed narrowband communications scheme.

\* \* \* \* \*